US011319673B2

(12) United States Patent
Aydin et al.

(10) Patent No.: US 11,319,673 B2
(45) **Date of Patent: *May 3, 2022**

(54) BIO-BASED PEC COMPOSITIONS AS BINDERS FOR FIBER BASED MATERIALS, TEXTILES, WOVEN AND NONWOVEN MATERIALS

(71) Applicant: ORGANOCLICKAB, Täby (SE)

(72) Inventors: Juhanes Aydin, Södertälje (SE); Maria Wennman, Solna (SE); Yujia Zhang, Täby (SE)

(73) Assignee: ORGANOCLICK AB, Täby (SE)

( * ) Notice: Subject to any disclaimer, the term of this patent is extended or adjusted under 35 U.S.C. 154(b) by 81 days.

This patent is subject to a terminal disclaimer.

(21) Appl. No.: 16/282,514

(22) Filed: Feb. 22, 2019

(65) Prior Publication Data

US 2019/0226150 A1 Jul. 25, 2019

Related U.S. Application Data

(63) Continuation of application No. PCT/SE2017/050852, filed on Aug. 24, 2017.

(30) Foreign Application Priority Data

Aug. 24, 2016 (SE) .................................... 1651136-2

(51) Int. Cl.

| | |
|---|---|
| ***D21H 21/20*** | (2006.01) |
| ***D21H 17/24*** | (2006.01) |
| ***D21H 17/29*** | (2006.01) |
| ***D21H 17/26*** | (2006.01) |
| ***D21H 17/27*** | (2006.01) |
| ***D21H 17/30*** | (2006.01) |
| ***D21H 17/31*** | (2006.01) |
| ***D21H 17/23*** | (2006.01) |
| ***D21H 17/14*** | (2006.01) |
| ***D21H 17/06*** | (2006.01) |
| ***D21H 21/36*** | (2006.01) |
| ***D21H 17/09*** | (2006.01) |
| ***D21H 17/11*** | (2006.01) |
| ***C08L 5/08*** | (2006.01) |

(Continued)

(52) U.S. Cl.

CPC .............. *D21H 21/20* (2013.01); *C08L 1/286* (2013.01); *C08L 5/08* (2013.01); *D06B 1/00* (2013.01); *D06M 15/03* (2013.01); *D21H 5/0005* (2013.01); *D21H 17/06* (2013.01); *D21H 17/09* (2013.01); *D21H 17/11* (2013.01); *D21H 17/14* (2013.01); *D21H 17/15* (2013.01); *D21H 17/23* (2013.01); *D21H 17/24* (2013.01); *D21H 17/26* (2013.01); *D21H 17/27* (2013.01); *D21H 17/29* (2013.01); *D21H 17/30* (2013.01); *D21H 17/31* (2013.01); *D21H 21/36* (2013.01)

(58) Field of Classification Search

None

See application file for complete search history.

(56) References Cited

U.S. PATENT DOCUMENTS 6,060,410 A * 5/2000 Gillberg-LaForce ........................ D06M 15/3562 442/118

6,555,225 B1 4/2003 Yoshioka et al.

(Continued)

FOREIGN PATENT DOCUMENTS

CN 102120514 A 7/2011
CN 105061821 A 11/2015

(Continued)

OTHER PUBLICATIONS

Zhao Q et al : "Synthesis and characterization of soluble chitosan/ sodium carboxymethyl cellulose polyelectrolyte complexes and the pervaporation dehyd ration of their homogeneous membranes", Journal of Membrane Science, Elsevier BV, NL, vol. 333, No. 1-2, May 1, 2009 (May 1, 2009), pp. 68-78, XP026031531, ISSN : 0376-7388, DOI: 10.1016/ J.MEMSCI. 2009 .02 .001 [retrieved on Feb. 10, 2009], https://www.sciencedirect.com/science/article/pii/ S0376738809000994.

(Continued)

*Primary Examiner* — Dennis R Cordray
(74) *Attorney, Agent, or Firm* — Gabriela B. Tomescu, Esq.; Bergenstråhle & Partners AB

(57) ABSTRACT

The present invention relates to a bio-based polyelectrolyte complex (PEC) composition suitable as a binder for fiber based materials, textiles, woven and nonwoven materials. The PEC composition comprises cationic biopolymer, anionic biopolymer acid and a polymer, and is further characterized in that

- the net charge of the PEC is cationic,
- the charge ratio of the anionic polymer and the cationic polymer is ≤1,
- the cationic biopolymer is chitosan, wherein the concentration of cation is 0.005-30%,
- the anionic biopolymer is polyanions derived from nature,
- the acid is a Brønsted acid and/or a Lewis acid, wherein the Brønsted acid is selected from any organic and/or inorganic acids, wherein the Lewis acid is selected from any cationic mono- or multivalent atom,
- the weight ratio between cation and anion is 1:0.1 to 1:20,
- the weight ratio between the cation and acid is 1:0.01 to 1:30,
- chitosan has a degree of deacetylation being 66-100%, and
- the pH is less than 7.

The present invention further relates to a method for preparing the PEC composition, uses of the PEC composition, as well as method of treating materials with the PEC composition.

4 Claims, 8 Drawing Sheets

(51) Int. Cl.

| | |
|---|---|
| ***C08L 1/28*** | (2006.01) |
| ***D06B 1/00*** | (2006.01) |
| ***D21H 23/22*** | (2006.01) |
| ***D06M 15/03*** | (2006.01) |
| ***D21H 17/15*** | (2006.01) |

(56) References Cited

U.S. PATENT DOCUMENTS

| | | | | |
|---|---|---|---|---|
| 2006/0205932 | A1 | 9/2006 | Cowan et al. | |
| 2007/0141013 | A1 | 6/2007 | Nguyen-Kim | |
| 2008/0005852 | A1* | 1/2008 | Hu ...................... | D06M 15/263<br>8/115.51 |
| 2011/0236450 | A1 | 9/2011 | Scheuing et al. | |
| 2011/0236582 | A1 | 9/2011 | Scheuing et al. | |
| 2013/0143041 | A1 | 6/2013 | Mathias | |
| 2013/0164311 | A1* | 6/2013 | DeCarlo .................. | C08J 3/075<br>424/184.1 |
| 2013/0216592 | A1 | 8/2013 | Delair et al. | |
| 2015/0105478 | A1 | 4/2015 | Van Der Krieken et al. | |

FOREIGN PATENT DOCUMENTS

| | | | |
|---|---|---|---|
| CN | 105148741 | A | 12/2015 |
| DE | 10120748 | A1 | 10/2002 |
| DE | 102010001891 | A1 | 8/2011 |
| DE | 102012012561 | A1 | 4/2014 |
| EP | 0504245 | A1 | 9/1992 |
| EP | 1096056 | A1 | 5/2001 |
| EP | 1247568 | A1 | 10/2002 |
| EP | 1254983 | A1 | 11/2002 |
| EP | 1579071 | B1 | 9/2005 |
| EP | 1918456 | A1 | 5/2008 |
| EP | 1942226 | A1 | 7/2008 |
| JP | H05117111 | A | 5/1993 |
| JP | H06277038 | A | 10/1994 |
| JP | 3289055 | B2 | 6/2002 |
| JP | 2005 247967 | A | 9/2005 |
| RU | 2 594 422 | C1 | 8/2016 |
| WO | 93 / 12282 | A1 | 6/1993 |
| WO | 9728311 | A1 | 8/1997 |
| WO | 0121671 | A1 | 3/2001 |
| WO | 2006029407 | A2 | 3/2006 |
| WO | 2007083262 | A1 | 7/2007 |
| WO | 2009/142719 | A2 | 11/2009 |
| WO | 2013133705 | A1 | 9/2013 |
| WO | 2013133706 | A1 | 9/2013 |
| WO | 2015034357 | A1 | 3/2015 |

OTHER PUBLICATIONS

Jiang Liuyun et al: "A novel composite membrane of chitosan-carboxymethyl cellulose polyelectrolyte complex membrane filled with nano-hydroxyapatite I. Preparation and properties", Journal of Materials Science: Materials in Medicine , Kluwer Academic Publishers, BO, vol. 20 , No. 8, Mar. 20, 2009 (Mar. 20, 2009), pp. 1645-1652, XP019730934, ISSN: 1573-4838, DOI: 10.1007/S10856-009-3720-6 paragraph [2 .2.] p. 71 , col. 1, paragraph 1; figure 1.

Chitosan Product Specification, www.sigmaaldrich.com.

Gärdlund, L. et al. "Polyelectrolyte complexes for surface modification of wood fibres II. Influence of complexes on wet and dry strength of paper" In: Colloids and Surfaces A:Physicochem. Eng. Aspects, 2003, vol. 218, pp. 137-149.

Szymanska, E. et al. "Stability of Chitosan—A Challenge for Pharmaceutical and Biomedical Applications" In: Marine Drugs, 2015, vol. 13, pp. 1819-1846.

Albertini Beatrice et al: "Novel multifunctional platforms for potential treatment of cutaneous wounds: Development and in vitro characterization", International Journal of Pharmaceutics, Elsevier, Amsterdam, NL, vol. 440, No. 2, Jun. 9, 2012 (Jun. 9, 2012), pp. 238-249, XP028962905 , ISSN: 0378-5173, 001.

Nirmala Devi et al: "Genipin Crosslinked Chitosan-[kappaJ-carrageenan Polyelectrolyte Nanocapsules for the Controlled Delivery of Isoniazid", International Journal of Polymeric Materials., vol. 59, No. 10, Aug. 2, 2010 (Aug. 2, 2010), pp. 828-841 , XP55420537, US ISSN: 0091-4037, 001: DOI: 10.1080/00914037.2010.484792.

Nirmala Devi et al: "A novel microencapsulation of neem (*Azadirachta indica* A. Juss. ) seed oil (NSO) in polyelectrolyte complex of [kappaJ-carrageenan and chitosan", Journal of Applied Polymer Science, vol. 113 , No. 3, Aug. 5, 2009 (Aug. 5, 2009), pp. 1576-1583, XP55420484, US ISSN: 0021-8995, 001 DOI: 10.1002/app.30038.

Dian-Yu Ji et al: "A novel injectable chitosan/ pol yglutamate polyelectrolyte complex hydrogel with hydroxyapatite for soft-tissue augmentation", Carbohydrate Polymers, Appli ed Sci ence Publishers, LTD. Barking, GB, vol. 89, No. 4, Mar. 26, 2012 (Mar. 26, 2012), pp. 1123-1130, XP028512034, ISSN: 0144-8617, DOI: 10.1016/j.carbpol.2012.03.083.

Drogoz, A. et al. "Towards Biocompatible Vaccine delivery Systems: Interactions of Colloidal PECs Based on Polysaccharides with HIV-1 p24 Antigen" In: Biomacromolecules, 2008, vol. 9, pp. 583-591 pp. 583-584.

Fatehi, P. et al. "Synergy of CMC and modified chitosan on strength properties of cellulosic fiber network" In: Carbohydrate Polymers, 2010, vol. 80, pp. 208-214; pp. 208-209.

Fatehi, P. et al. "Complex formation of modified chitosan and carboxymethyl cellulose and its effect on paper properties" In: Tappi Journal, 2009, vol. 8, pp. 29-35; pp. 29-30.

* cited by examiner

BIO-BASED PEC COMPOSITIONS AS BINDERS FOR FIBER BASED MATERIALS, TEXTILES, WOVEN AND NONWOVEN MATERIALS

TECHNICAL FIELD

This application is the continuation of International Application No. PCT/SE2017/050852, filed 24 Aug. 2017, which claims the benefit of Swedish Patent Application No. SE 1651136-2, filed 24 Aug. 2016, the entire contents of which are hereby incorporated by reference.

The present invention relates to biopolymer based polyelectrolyte complex (PEC) compositions which are environmentally benign, renewable and biodegradable. The PEC compositions comprise chitosan as a cationic polymer and an anionic polymer being represented by polyanions derived from nature, especially polysaccharides.

The PEC compositions according to the present invention are suitable as binders for fiber based materials, textiles, woven and nonwoven materials. The treatment of fiber based materials, textiles, woven and nonwoven materials with the PEC composition provide materials which have higher dry and/or wet strengths, i.e. higher dry and/or wet tensile indexes. Moreover, the PEC compositions may also comprise one or more additives which provide the treated materials with lower tensile stiffness as well as higher stability.

BACKGROUND

PECs are the association complexes formed between oppositely charged particles such as polymer-polymer, polymer-drug and polymer-drug-polymer. These complexes are formed due to electrostatic interaction between oppositely charged polyions and thereby avoids the use of chemical cross linking agents (S. Lankalapalli, 2009). Based on origin PECs are classified as natural polyelectrolytes, synthetic polyelectrolytes and chemically modified biopolymers.

The PECs composition according to the present invention comprise organic molecules of biological origin (i.e. biopolymers) represented by polyanions derived from nature, which are either natural polyelectrolytes or chemically modified biopolymers. Hence, the PECs do not comprise synthetic polymers and synthetic polyelectrolytes and therefore the PEC compositions according to the present invention are bio-based PEC compositions.

EP0723047 relates to PEC suspensions for papermaking. However, the PEC suspensions do not comprise chitosan as a cation. Instead the cation is a synthetic polymer such as a copolymer of acrylamide with diallyldimethylammonium chloride. Hence, the PECs in EP0723047 are not bio-based PECs. More importantly, there is no data or reference to (i) any increase in wet strength of treated materials, (ii) effect on tensile stiffness of treated materials, and/or (iii) stability of the PECs over a period of several months.

EP1918455 relates to producing fibrous webs by using PECs having a negative net charge. Furthermore, the PECs do not comprise chitosan as a cation. Instead the cation is a synthetic polymer such as acrylic polymers, polyacrylamides and amido-amine polymers. Consequently, the PECs according to EP1918455 are not bio-based.

U.S. Pat. Nos. 8,993,505, 9,012,389 and 9,273,220 relate to PECs for reduced soiling tendency, reduced cleaning effort and reducing microbial challenge. However, the PECs are not wholly of biological origin since they in addition to biopolymers also comprise synthetic polymer such as (i) homopolymer of diallyl dimethyl ammonium chloride "DADMAC" disclosed in claim 1 of U.S. Pat. No. 8,993,505, (ii) homopolymer of acrylic acid or a random copolymer of acrylic acid disclosed in claim 1 of U.S. Pat. No. 9,012,389, (iii) homo- or copolymers of the following anionic monomers: acrylic acid, methacrylic acid, maleic acid, maleic anhydride, itaconic acid, styrene sulfonic acid and acrylamide propane sulfonic acid disclosed in U.S. Pat. No. 9,273,220. Consequently, the PECs according to U.S. Pat. Nos. 8,993,505, 9,012,389 and 9,273,220 are not bio-based. More importantly, there are no data or reference to (i) any increase in dry strength and wet strength of treated materials, (ii) effect on tensile stiffness of treated materials, and/or (iii) stability of the PECs over a period of several months. Hence, none of U.S. Pat. Nos. 8,993,505, 9,012,389 and 9,273,220 have the same purpose or aim as the present invention.

US2013216592 relates to a PECs consisting of biopolymers. However, the PECs are in the form of particles and not in solution. More importantly, there are no data or reference to (i) any increase in dry strength and wet strength of treated materials, (ii) effect on tensile stiffness of treated materials, and/or (iii) stability of the PECs over a period of several months. Hence, US2013216592 does not have the same purpose or aim as the present invention.

U.S. Pat. No. 6,936,746 relates to PEC solid material systems. Hence, the PECs are in the form of solid materials and not as solutions. Moreover, U.S. Pat. No. 6,936,746 is silent about the net charge of the PECs. Furthermore, U.S. Pat. No. 6,936,746 is also silent about the charge ratio between the cationic polymer and the anionic polymer. More importantly, there is no data or reference to (i) any increase in dry strength and wet strength of treated materials, (ii) effect on tensile stiffness of treated materials, and/or (iii) stability of the PECs over a period of several months. Hence, U.S. Pat. No. 6,936,746 does not have the same purpose or aim as the present invention.

Furthermore, specific embodiments of PEC composition described in the prior art have a concentration of 0.04% PEC due to stability issues. Hence there is also a need for PEC composition having a higher concentration of PEC. PEC is being produced from tap water, which according to prior art should not be possible due to stability issues.

OBJECT OF THE INVENTION

The object of the invention is to provide a biopolymer based PEC composition that is environmentally benign, renewable and biodegradable.

A further object of the invention is to provide a biopolymer based PEC composition which is stable for at least half a year.

A further object of the invention is to provide a biopolymer based PEC composition comprising at least 0.04%, preferably at least 1.5% PEC, more preferably at least 4% PEC, most preferably 4-10% PEC by weight A further object of the invention is to provide a biopolymer based PEC composition which does not mold.

A further object of the invention is to provide a biopolymer based PEC composition which comprises an anionic biopolymer which has a low cost.

A further object of the invention is to provide a biopolymer based PEC composition which is suitable as binder for fiber based materials, textiles, woven and nonwoven materials.

A further object of the invention is to provide a biopolymer based PEC composition which is suitable as strength additive for fiber based materials, textiles, woven and nonwoven materials.

A further object according of the invention is to provide a biopolymer PEC composition, wherein the nonwoven materials are mineral fibres such as glass or rock fibres.

A further object of the invention is to provide a biopolymer based PEC composition which is stable in tap water. According to prior art minerals in water destabilizes the PEC.

A further object of the invention is to provide a biopolymer based PEC composition which gives wet tensile strength and/or dry tensile strength to fiber based materials, textiles, woven and nonwoven materials.

A further object of the invention is to provide a method for achieving the above biopolymer based PEC compositions.

A further object of the invention is to provide fiber based materials, textiles, woven and nonwoven materials which have (i) high wet tensile strength, and/or (ii) high dry tensile strength and/or (iii) softness and/or (iv) stiffness.

Any combination of the above objects is also possible.

SUMMARY OF THE INVENTION

The objects of the invention are attained by a bio-based PEC composition comprising cationic biopolymer, anionic biopolymer, acid, preservative and water. The expression bio-based indicates that the PEC composition is of biological origin. The net charge of the PEC composition is cationic and the charge ratio between the anionic polymer and the cationic polymer is ≤1. Moreover, the weight ratio between cationic polymer and anionic polymer is 1:0.1 to 1:20. Ratios in the present invention are weight ratios unless otherwise indicated.

PEC compositions according to the present invention comprises chitosan which imparts higher tensile index when compared to other cations such as cationic starch and cationic cellulose. Hence, the preferred embodiments of the invention comprise cationic chitosan as cationic biopolymer. The concentration of chitosan in the composition is 0.005-30%. Moreover, chitosan preferably has a degree of deacetylation which ranges from 66%-100%. The degree of deacetylation is important for the physical properties of chitosan in the PEC composition.

The anionic biopolymer being a polyanion derived from nature can be selected from lignin alkali, lignosulfonic acid or a polysaccharide, such as carboxymethyl cellulose (CMC) (preferably sodium salt), alginic acid (preferably the sodium salt), xanthan gum, pectin, carrageenan, nanocrystalline cellulose (NCC) and gum arabic. Lignin alkali and lignosulfonic acid preferably as the sodium salt. The concentration of anionic biopolymer in the composition is 0.005-30% by weight. Concentrations in % in the present invention are concentrations in weight % unless otherwise indicated.

CMC, alginic acid and lignin are preferred as anionic; biopolymer when the objective is to achieve highest increase in wet and dry tensile strengths in fiber based materials, textiles, woven and nonwoven materials. Of the three preferred anionic biopolymers, CMC is the most preferred on nonwoven since it gives rise to the highest increase in tensile index and is also the cheapest one of the anionic biopolymers. When the objective is to achieve low tensile stiffness (i.e. softness) then CMC and NCC are preferred as anionic biopolymers. Furthermore, CMC is preferred when the objective is to attain both high tensile index and low tensile stiffness. When the PEC composition of the invention is added to a cellulosic/fiber suspension it acts as an additive increasing the strength.

The pH of the PEC composition is below pH 7 and this may be achieved by the addition of Brønsted acid and/or a Lewis acid. Brønsted acids are selected from any organic or inorganic acids, wherein the concentration of the acid is 0.01-30%. Lewis acids are selected from any cationic mono- or multivalent atom, wherein the concentration of the Lewis acid is 0.01-30%. The PEC composition preferably has a pH value lower than 6.5, preferably the pH value is 1.8-4. The weight ratio between the cationic polymer and the acid is 1:0.01 to 1:30 in the PEC composition. The acid of the PEC composition is selected from one or more of acetic acid, acetylsalicylic acid, adipic acid, benzenesulfonic acid, camphorsulfonic acid, citric acid, dihydroxy fumaric acid, formic acid, glycolic acid, glyoxylic acid, hydrochloric acid, lactic acid, malic acid, malonic acid, maleic acid, mandelic acid, oxalic acid, para-toluenesulfonic acid, phtalic acid, pyruvic acid, salicylic acid, sulfuric acid, tartaric acid and succinic acid, more preferably citric acid, oxalic acid and tartaric acid, most preferably citric acid, and most preferably citric acid monohydrate.

The concentration of the PEC in the PEC composition is at least 0.04 wt % PEC, preferably at least 1.5 wt % PEC, more preferably at least 4 wt % PEC, most preferably 4-10wt % PEC. Furthermore, the PEC compositions according to the present invention are dilatable. Manufacturing of high concentrations of PEC compositions are advantageous in view of lowering shipping cost, i.e. the PEC composition can be prepared with a high concentration and then diluted after shipping by the user or customer.

The solvent of the PEC composition is water selected from distilled water, tap water and deionized water. PEC compositions comprising chitosan are in the art known for being unstable in tap water and are therefore prepared in distilled water in prior art documents. However, the PEC compositions according to the present invention are stable in tap water, The PEC composition may also be in neat form, i.e. the PEC composition does not comprise added water.

The PEC composition may also comprise one or more additives selected from, a water soluble plasticizer, defoamer, foaming agent, wetting agent, coalescent agent, catalyst, surfactant, emulsifier, conservative, cross-linker, rheology modifier, filler, nonionic polymer, dye, pigment and said additives are selected from depending on application method and expected final material properties, wherein the concentration of the additive is 0-99% by weight, preferably 0-50% by weight more preferably 0-30% by weight.

The PEC composition may further comprise a water soluble plasticizer in preferred embodiments of the invention. The plasticizer may be a natural-based plasticizer which is also biodegradable. The biodegradable natural-based water soluble plasticizer can be selected from one or more of polyols, monosaccharides, amino acids and surfactants. The plasticizer is preferably selected from one or more polyols, such as, glycerol, sorbitol, mannitol, xylitol and the like, one or more monosaccharides, such as, glucose, mannose, fructose, sucrose and the like, sucralose, sucrose esters, glycerol triacetate, glycerin, ethylene glycol, triethylene glycol, tetraethylene glycol, polyethylene glycol, propylene glycol, acetamide, formamide, dodecanol, citrate, ethanolamine, diethanolamine, triethanolamine and urea. The biodegradable natural-based plasticizer is preferably sorbitol. We have discovered that including a plasticizer imparts a lower tensile stiffness to fiber based materials, textiles, woven and nonwoven materials. The concentration of the plasticizer in the PEC composition is at least 0.05 wt %, preferably 1-50 wt %.

The PEC composition further comprise one or more preservatives selected from one or more of fungicide, bactericide, pharmaceutical preservative, cosmetic preservative and food preservatives. The concentration of the preservative is 0.005-10 wt %, preferably 0.005-1.5wt %, more preferably 0.005-0.5 wt %. Moreover, the preservative is preferably biodegradable and/or renewable. Food preservatives, pharmaceutical preservatives and cosmetic preservatives are preferred since they are non-toxic. The inclusion of a preservative helps to inhibit the growth of mold in the PEC composition. Moreover, we have discovered that PEC compositions without preservative become more yellow/brown than a composition comprising preservative. Even if performance is the same between the more yellow and less yellow PEC composition, the yellow color is transferred to material and causes yellowing which is unwanted especially for nonwovens and cellulosic materials such as textiles.

The food preservative can be selected from benzoic acid, sodium benzoate, hydroxybenzoate and derivatives thereof, lactic acid, propionic acid and sodium propionate, sulfur dioxide and sulfites, sorbic acid and sodium sorbate, ascorbic acid, sodium ascorbate, butylated hydroxytoluene, butylated hydroxyanisole, gallic acid and sodium gallate and tocopherols.

A fungicide or bactericide such as 1,2-benzisothiazolin-3-one can be included in the PEC-composition. Moreover, a cosmetic preservative such as 2-methyl-4-isothiazolin-3-one can either alone, or in combination with 1,2-benzisothiazolin-3-one be included in the PEC-composition. Furthermore, a pharmaceutical preservative such as 2-Bromo-2-nitro-1,3-propanediol can either alone or in combination with either one of, or both of 1,2-benzisothiazolin-3-one and 2-methyl-4-isothiazolin-3-one be included in the PEC-composition.

The composition can additionally comprise an acid or basic catalyst which has in particular the role of adjusting the temperature at which crosslinking begins. The catalyst can be chosen from Lewis bases and acids, such as clays, colloidal or noncolloidal silica, organic amines, quaternary amines, metal oxides, metal sulphates, metal chlorides, urea sulphates, urea chlorides and catalysts based on silicates.

The catalyst can also be a phosphorus-comprising compound, for example an alkali metal hypophosphite salt, an alkali metal phosphite, an alkali metal polyphosphate, an alkali metal hydrogenphosphate, a phosphoric acid or an alkylphosphonic acid. Preferably, the alkali metal is sodium or potassium.

The catalyst can also be a compound comprising fluorine and boron, for example tetrafluoroboric acid or a salt of this acid, in particular an alkali metal tetrafluoroborate, such as sodium tetrafluoroborate or potassium tetrafluoroborate, an alkaline earth metal tetrafluoroborate, such as calcium tetrafluoroborate or magnesium tetrafluoroborate, a zinc tetrafluoroborate and an ammonium tetrafluoroborate. Preferably, the catalyst is sodium hypophosphite, sodium phosphite and the mixtures of these compounds.

The amount of catalyst introduced into the composition can represent up to 20 wt %, preferably up to 10%, and advantageously is at least equal to 1%.

In preferred embodiments of the invention, dry powder PEC compositions comprises chitosan, CMC and citric acid. In other preferred embodiments of the invention, dry powder PEC compositions comprises chitosan, CMC, citric acid and plasticizer. Similarly, liquid PEC compositions comprises chitosan, CMC, citric acid, plasticizer and water. In preferred embodiments of said dry powder and liquid PEC compositions, the plasticizer is sorbitol, and moreover, the composition also comprises a preservative.

The PEC composition may comprise 0.75-6 wt % chitosan, 0.75-6 wt % GMC and 6-30 wt % citric acid monohydrate. In a further embodiment of the invention, the PEC composition may comprise 0.75-4 wt % chitosan, 0.75-4 wt % GMC and 6-24 wt % citric acid monohydrate.

In a preferred embodiment, the PEC composition comprises 0.75-2 wt % chitosan, 0.75-2 wt % CMG and 9-12 wt % citric acid monohydrate. Preferred embodiments of such compositions have a pH of 1.8-2.5 and the ratio of CMC:chitosan:citric acid mono hydrate being from 1:1:1 to 1:1:12, preferably from 1:1:4.2 to 1:1:12, more preferably 1:1:6 to 1:1:12, most preferably 1:1:6 or 1:1:12 Additionally, said compositions also comprise a preservative and optionally a plasticizer. A preferred plasticizer is sorbitol while a preferred preservative is a food preservative.

In a further preferred embodiment, the PEC composition comprises 0.75 wt % chitosan, 0.75 wt % CMG, 9 wt % citric acid monohydrate, sorbitol and preservative, wherein the pH of the PEC composition is 1.8-2.5 and the ratio of CMG:chitosan:citric acid mono hydrate is 1:1:12. The composition further comprises preservative and optionally sorbitol, more preferably the composition comprises both sorbitol and preservative.

In a further preferred embodiment, the PEC composition comprises 2 wt % chitosan, 2 wt % CMC, 12 wt % citric acid monohydrate and a preservative, wherein the pH of the PEC composition is 1.8-2.5 and the ratio of CMC:chitosan:citric acid mono hydrate is 1:1:6. The composition further comprises preservative and optionally sorbitol, more preferably the composition comprises a preservative.

The objects of the invention are also attained by a method of preparing the above disclosed embodiments of PEC compositions. For the production of a dry powder PEC composition, the method comprises the steps of mixing chitosan, anionic polymer, acid and preservative. For the production of a liquid PEC composition, the method comprises the steps of mixing chitosan, anionic polymer, acid and water. The method of producing a liquid PEC composition may comprise one or more homogenization steps.

In a preferred embodiment, the method comprises the steps of:

a) Adding the anionic polymer to water, b) Adding chitosan to the resulting mixture in step a, c) Mixing the acid with water, and adding the resulting acidic solution to the resulting mixture in step b, wherein the resulting mixtures in steps a-c are mixed with preservative and optionally homogenized. In another embodiment, the acid is not mixed with water in step c and the acid is instead added to the mixture in step b.

For PEC compositions comprising a plasticizer and preservative, the preferred embodiment of the method comprises the steps of:

a) Adding the anionic polymer to a mixture of water and plasticizer, b) Adding chitosan to the resulting mixture in step a, c) Mixing the acid with water, and adding the resulting acidic solution to the resulting mixture in step b, and d) Adding a preservative to the resulting mixture in c, and wherein the resulting mixtures in steps a-d are mixed and optionally homogenized.

For PEC compositions comprising a preservative and additive, the preferred embodiment of the method comprises the steps of:

a) Adding the anionic polymer to water, b) Adding chitosan to the resulting mixture in step a, c) Mixing the acid with water, and adding the resulting acidic solution to the resulting mixture in step b, and d) Adding an additive to the resulting mixture in step c e) Adding a preservative to the resulting mixture in step d, and wherein the resulting mixtures in steps a-e are mixed and optionally homogenized. The additive is selected from plasticizer, defoamer, foaming agent, wetting agent, coalescent agent, catalyst, surfactant, emulsifier, conservative, cross-linker, rheology modifier, filler, non-ionic polymer, dye and pigment.

The objects of the invention are also attained by using the above disclosed embodiments of PEC compositions as a binder for fiber based materials, textiles, woven and non-woven materials. The use of the PEC composition is preferably for providing higher dry strength and/or wet strengths to said fiber based materials, textiles, woven and nonwoven materials.

The objects of the invention are also attained by fiber based material, textiles, woven and nonwoven materials comprising the above disclosed embodiments of PEC compositions as a binder.

The objects of the invention are also attained by an apparatus comprising the above disclosed embodiments of PEC compositions as a binder. The apparatus is any kind of laboratory or industrial equipment using low or high shear forces for producing the PEC compositions. This might be a magnet stirrer, overhead stirrer with propeller or disperser or like, homogenizer with or without high pressure, in-line or external homogenizers, extruders, shaking equipment, mortar and pestle, blender type of instrument, any kind of mixer (static mixer, micro mixer, vortex mixer, industrial mixer, ribbon blender, V blender, continuous processor, cone screw blender, screw blender, double cone blender, double planetary, high viscosity mixer, counter-rotation, double and triple shaft, vacuum mixer, high shear rotor stator, dispersion mixer, paddle, jet mixer, mobile mixer, drum mixer, intermix mixer, planetary mixer, Banbury mixer or like), French press, disintegrator, mill (grinding by bead mill, colloid mill, hammer mill, ball mill, rod mill, autogenous mill, semi-autogenous grinding, pebble mill, high pressure grinding roils, buhrstone mill, vertical shaft impactor mill, tower mill or like), ultrasonic treatment, rotor-stator mechanical equipment, any kind of propeller or mixer, high temperature and/or high pressure bitumen emulsifiers or combinations of the above.

The objects of the invention are also attained by a method of treating fiber based materials, textiles, woven and non-woven materials with the above disclosed embodiments of PEC compositions as a binder, comprising the steps of:

a. Treating the fiber based materials, textiles, woven and nonwoven materials with a PEC composition by
   i. addition to fiber and nonwoven suspensions,
   ii. spray coating,
   iii. dip coating,
   iv. roll coating,
   v. impregnation,
   vi. padding,
   vii. screen coating,
   viii. printing,
   ix. direct coating methods including knife coating, blade coating, wire wound bar coating, round bar coating and foam coating (e.g. crushed foam coating), and the like
   x. indirect coating methods including mayer rod coating, direct roll coating, kiss coating, gravure coating and reverse roll coating, and the like
   xi. ink jet and/or slit-die/slot-die, and b. optionally curing the treated fiber based materials, textiles, woven and nonwoven materials.

In a preferred embodiment, the method of treating comprises the step of curing the treated fiber based materials, textiles, woven and nonwoven materials. In a further preferred embodiment, the curing is performed at 20° C. to 200° C., more preferably at 100° C.-200° C., most preferably at 120° C. to 180° C.

DETAILED DESCRIPTION

Figure 1:
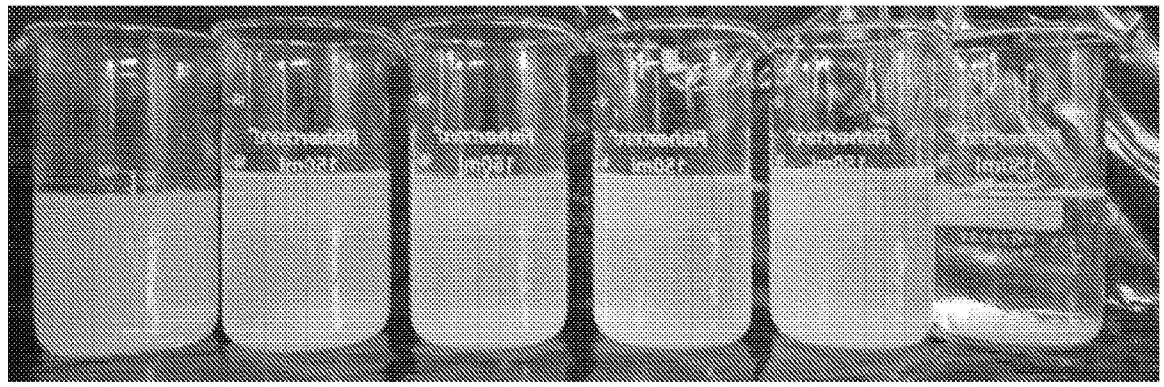
FIG. 1—PEC with chitosan and CMC in solutions having pH 4, 5, 6, 6.3, 6.7 and 7 comprising <0.05 wt % PEC.

The present invention relates to biopolymer based PEC compositions that are an environmentally benign, renewable and biodegradable mixture of firstly a cationic biopolymer and an anionic biopolymer. The cationic and anionic polymers are balanced so that the net charge of the PEC is cationic. The PEC compositions are prepared in the presence of an acid and also includes a preservative and may include additives such as plasticizer(s)). The PEC compositions are suitable as binders for fiber based materials, textiles, woven and nonwoven.

According to the invention the use of the wording textiles, woven and nonwoven may include cloths or fabrics and may be based on natural or synthetic fibers and mixtures thereof. Textiles, woven and nonwoven may consist of a network of natural and/or synthetic fibers often referred to as thread or yarn. Yarn is produced by spinning raw fibers of wool, flax, cotton, or other material to produce long strands. Textiles are formed by weaving, knitting, crocheting, knotting, or pressing fibers together (felt). The words fabric and cloth may for example be used in textile assembly trades (such as tailoring and dressmaking) as synonyms for textile. Textile may refer to any material made of interlacing fibers or nonwoven textiles. Fabric refers to any material made through weaving, knitting, spreading, crocheting, or bonding that may be used in the production of further goods (garments, etc.). Cloth may be used synonymously with fabric but often refers to a finished piece of fabric used for a specific purpose (e.g., table cloth). The wording textiles, woven and nonwoven according to the present invention may include all different types of textiles described above. Textiles, woven and non-woven according to the invention can be made from many different types of materials and fibers for example animal, plant, wood, mineral, synthetic, sugar based, protein based for example wool, silk, mohair, cashmere, pygora, cameldown, alpaca, llama, vicuna, guanaco, angora, qiviut, ramie, nettle, milkweed, cotton, linen, flax, jute, hemp, viscose, asbestos, glass fiber, rock fiber, nylon, elastan, polyester, acrylic, polyamide, polypropylene, polyurethane and its derivatives, corn fiber, coir, yucca, sisal, bamboo (rayon) fiber, peanut, soybased, chitin based, milk casein based, keratin based and poly lactic acid based etc. Further, nonwoven materials are fabric-like materials made from long fibers, bonded together by chemical, mechanical, heat or solvent treatment. Nonwoven fabrics are also defined as sheet or web structures bonded together by entangling fiber or filaments (and by perforating films) mechanically, thermally or chemically. The term is used in the textile manufacturing industry to denote fabrics, such as felt, which are neither woven nor knitted. They are flat or tufted porous sheets that are made directly from separate fibers, molten plastic or plastic film.

Fiber based materials refer to materials such as paper materials which comprise a high degree of cellulose. As will be understood by those skilled in the present field of art, numerous changes and modifications may be made to the above described and other embodiments of the present invention, without departing from its scope as defined in the appending claims. For example, the pulps for making fiber based materials may be any kind of pulp, i.e. mechanical pulp, thermo-mechanical pulp, chemo-mechanical pulp, sulphate pulp, sulphite pulp, bleached pulp, unbleached pulp, short-fiber pulp, long-fiber pulp, recycled fibers, mixtures of different pulp grades etc. The invention works irrespective of the kind of pulp chosen.

As shown in Examples 1-25, a very extensive comparative study was conducted on various combinations of cationic and anionic biopolymers in order to identify one or more PEC compositions which achieved the objects of the invention.

Examples 1-11 relate to comparative studies for identifying the PEC compositions which provide the highest increase in dry tensile index, i.e. dry and wet strength. Moreover, Examples 1-11 also relate to developing the most optimal:

(i) concentrations of cationic and anionic biopolymers, (ii) weight ratios between cationic and anionic biopolymers, (iii) charge ratios between cationic and anionic biopolymers, (iv) pH of the PEC composition, (v) acid, and (vi) concentration of PEC in the PEC composition.

Example 12 relates to a comparative study in which chitosan and cationic starch are compared as cationic biopolymers. Moreover, the various concentrations (amounts) of PEC in the PEC compositions are also tested in order to determine the concentration of PEC which provides the highest increase in tensile index.

Example 13 is not a single study but a big number of studies which have been summarized. Example 13 relates to comparative experiments conducted on stability, color changes and mold development of PEC compositions comprising chitosan as cationic biopolymer and CMC as anionic biopolymer.

Examples 14-25 relate to comparative studies between PEC compositions, as well as between PEC compositions and non-PEC compositions. The aim is to identify compositions which give rise to high dry and wet strengths (i.e. high tensile index), as well as high softness (i.e. low tensile stiffness), on fiber based and nonwoven materials treated by PEC and non-PEC compositions. The effect of curing at elevated temperature has also been analyzed.

METHODS AND CHEMICALS

Below, all experimental chemicals, equipment and methods used in example 1-25 are described.

Chemicals

All chemicals used within the present invention are described in Table A.

TABLE A

Chemicals used for the present invention and their commercial name as well as their suppliers/distributors.

| Chemical | Commercial name | Supplier or distributor |
|---|---|---|
| Citric acid mono hydrate | Citronsyra Mono E33 8-80M LT | Univar AB |
| Chitosan | Chitosan 90/100/A1 | Kraeber |
| Chitosan practical grade | Chitosan practical grade | Sigma Aldrich |
| Chitosan, <75% deacetylated | Chitosan, <75% deacetylated | Sigma Aldrich |
| Chitosan low MW | Chitosan low MW | Sigma Aldrich |
| Chitosan medium MW | Chitosan medium MW | Sigma Aldrich |
| Chitosan | Chitosan 90/100/A1 | Kraeber |
| Polyquaternium 10 | Celquat SC240C | Akzo Nobel |
| Polyquaternium 10 | Celquat SC230M | Akzo Nobel |
| Polyquaternium 4 | Celquat L-200 | Akzo Nobel |
| Cationic starch | Solbond PC 170MP | Solam/Emsland |
| Polyquaternium 4 | Celquat H-100 | Akzo Nobel |
| Cationic starch | Solsize P 85 | Solam/Emsland |
| Polyquaternium 4/HPC Starch copolymer | Celquat LS-50 | Akzo Nobel |
| Oxidized cationic starch (Solsize P 85)[1] | | — |

TABLE A-continued

Chemicals used for the present invention and their commercial name as well as their suppliers/distributors.

| Chemical | Commercial name | Supplier or distributor |
|---|---|---|
| Cationic starch | Solsize POC 50 | Solam/Emsland |
| Cationic starch | Solsize POC 1330 | Solam/Emsland |
| Oxidized cationic starch (Solsize POC 1330) | [1)] | — |
| Cationic starch | Solbond PC30 | Solam/Emsland |
| Carrageenan | Genuvisco CG-129 | CP Kelco |
| Alginic acid, sodium salt | Alginic acid, sodium salt, sodium salt, Sodium alginate | Sigma Aldrich |
| CMC | FinnFix 2 | CP Kelco |
| CMC | FinnFix 5 | CP Kelco |
| Alginic acid, sodium salt | Alginic acid, sodium salt sodium salt, from brown algae | Sigma Aldrich |
| Xanthan gum | Kelzan AP | CP Kelco |
| Lignin alkali | Lignin alkali (Lignin kraft, low sulfonate content) | Sigma Aldrich |
| Pectin | Pectin, from apple/poly-D-galacturonic acid methyl ester | Sigma Aldrich |
| Lignosulfonic acid, sodium salt | Lignosulfonic acid, sodium salt, | Sigma Aldrich |
| Hydroxypropyl cellulose (HPC) | Klucel L industrial | Ashland |
| Nanocrystalline cellulose (NCC) | Sonicated NCC, Batch 2014/07/16. Acid hydrolysis (using sulfuric acid) of cellulose | Melodea |
| Biocide | Nipcide BSM | Clariant |
| Sorbitol | Neosorb 70/70 | Roquette |

[1)] No commercial product, since the oxidation was made in lab.

Equipments

- pH in formulations was measured with pHenomenal pH1000H from VWR with Hamilton Polilyte Lab Temp BNC electrode (calibrated with buffers pH 4, 7 and 10). pH in pulp suspensions was measured with Radiometer PHM 83 Autocal pH Meter with red rod electrode GK2401C (calibrated with buffers pH 4, 7 and 10).
- Particle charge was measured using Mütek PCD 02 device.
- Tensile tests were conducted using Testometric M250-2.5AT (machine capacity 2.5 kN) together with Wintest Analysis software.
- Pulp suspension was created using a pulper Tico 732 Hengstler from PTI Austria.
- Paper sheets were produced on lab scale using Rapid-Köthen sheet former type RK-2A.
- Stirring of formulations and pulp suspensions was done with an overhead stirrer from IKA (either Eurostar digital IKA-Werke or IKA RW28 basic) together with a propeller.
- Homogenization of formulations was done using IKA T25 digital Ultra-Turrax.
- Viscosity of formulations were measured with Brookfield DV-II+Pro LV Viscometer together with Rheocal software using spindle LV4 at 50, 10 and 6 rpm.
- Coating of paper and nonwoven was performed with Wichelhaus WI-MU 505 A horizontal padder.
- Drying of treated paper and nonwoven were done in Wichelhaus Wi-LD3642 Minidryer/Stenter or oven from Termaks.
- Weighing material for water absorption tests was done with XT 220A Precisa swissmade balance.

Methods

Method 1:

Tensile testing of dry papers was performed using Testometric M250-2.5AT (pretension: 0.1 N, sample length: 100 mm, sample width: 15 mm, speed: 20 mm/min, Loadcell 0: 50 kgf) after having test specimens at least 20 h in 23° C. and 50% RH. Three test specimen for each paper sheet was cut out and tested.

Method 2:

Tensile testing of wet papers was performed using Testometric M250-2.5AT with a Finch cup installed in the load cell (pretension: 0.05 N, sample length: 100 mm, sample width: 15 mm, speed: 50 mm/min, Load cell 0: 50 kgf) after having test specimens at least 20 h in 23° C. and 50% RH and then dipped in the Finch cup for 30 s Three test specimen for each paper sheet was cut out and tested.

Method 3:

Tensile testing of dry nonwoven was performed using Testometric M250-2.5AT (pretension: 0.01 N, sample length: 200 mm, width: 50 mm, speed: 100 mm/min, Load cell 1: 50 kgf) after having test specimens at least 20 h in 23° C. and 50% RH. Three pieces for each test point were treated. Two test specimen for each treated piece was cut out and tested.

Method 4:

Tensile testing of wet nonwoven was performed using Testometric M250-2.5AT (pretension: 0.01 N, sample length: 200 mm, width: 50 mm, speed: 100 mm/min, Load cell 1: 50 kgf) after having test specimens at least 20 h in 23° C. and 50% RH and then soaked in water for 15 min. Three pieces for each test point were treated. Two test specimen for each treated piece was cut out and tested.

Method 5:

Coating paper and nonwovens with the horizontal padder using pressure 0.1 MPa and speed 11.6 together with drying with or without stenter frame in elevated temperatures for some minutes. Three pieces for each test point were treated. Three pieces at each test point were made.

Method 6:

Charge density was measured using the Mütek PCD 02 device. Charge (symbol: q, unit: meqv) was calculated using Eq. 1.

$$q[\text{meqv}]=C_{counter\ ion}[\text{eqv}/l]\cdot V_{Counter\ ion}[l]\cdot 1000 \quad (1)$$

where the counter ion is one of sodium polyethylenesulphate (PES-Na, anionic) or poly-diallyl-dimethyl-ammoniumchloride (poly-dadmac, cationic), depending on the charge of the colloid. If the charge at different concentrations are plotted against mass of the current colloid, the charge density (unit: meqv/g) is the slope of the linear curve. The mass of the colloid can be calculated with Eq. 2.

$$m[g\text{colloid}]=\text{wt \% colloid}[g\text{ colloid}/g\text{ solution}]\cdot g[g\text{ solution for 10 ml}]\cdot 0.0 \quad (2)$$

When the charge densities were known for one polycation and one polyanion, the charge ratio was calculated between the polyelectrolytes so that the overall charge of the complex became positive (i.e. charge ratio<1), see Eq. 3.

$$\text{Charge ratio} = \frac{[\text{part of complex} * \text{charge density}]_{polyanion}}{[\text{part of complex} * \text{charge density}]_{polycation}} \quad (3)$$

The method above is for measuring charge density and then calculate the charge ratio Method 7:

Pulp suspension consisting of old corrugated cardboard (OCC) or OCC:newspaper 80:20 was prepared in 18-22° C. tap water and diluted to 0.5 wt %. The total amount (20 l) was divided to 2.5-4 l and the pH was adjusted to 5.5-6.5 (if nothing else is mentioned) with citric acid solution (citric acid mono hydrate:tap water, 1:2) in every batch, prior use. The strength system (i.e. PEC composition) was then added to the pulp suspension in different amounts and stirred vigorously with a propeller 30 min (if nothing else is mentioned) before the sheet forming was started. The pH was controlled 2-3 times during this 30 min and adjusted to <6.5 if it had risen (if nothing else is mentioned).

Method 8:

Paper sheets were produced using Rapid Köthen sheet former and then dried for 8 min at 92° C. under vacuum (about 100 kPa). The resulting sheets got a paper density of about 60 g/m$^2$. Five sheets at each test point were made.

Method 9:

Tensile testing of dry nonwoven was performed using Testometric M250-2.5AT (pretension: 0.1 N, sample length: 200 mm, width: 50 mm, speed: 100 mm/min, Load cell 1: 50 kgf) after having test specimens at least 20 h in 23° C. and 50% RH Method 10:

Tensile testing of wet nonwoven was performed using Testometric M250-2.5AT (pretension: 0.01 N, sample length: 200 mm, width: 50 mm, speed: 100 mm/min, Load cell 1: 50 kgf) after having test specimens at least 20 h in 23° C. and 50% RH and then soaked in water for 30 sec. The test specimens were folded from the middle and mounted in the grips.

Method 11:

Water absorption was measured by the following modified procedure from EDANA Nonwovens absorption test: 1. Two test pieces (50 mm×50 mm) were cut from the treated sheet. 2. The test pieces were weighed to an accuracy of 0.01 g ($m_0$). 3. One test piece was mounted at the edges with clips and placed approximately 20 mm below the deionized water surface in a container. 4. After 60 s, one clip on the edge was kept and the test piece was hanged freely to drain for 120 s. 5. The test piece was taken to the balance without squeezing the liquid from it and weighed ($m_{wet}$). 6. Water absorption capacity was then calculated from ($m_{wet}$−$m_0$)/$m_0$. This is a procedure for water absorption capacity.

EXAMPLES 1-13—IDENTIFYING PEC COMPOSITIONS WITH HIGHEST INCREASE IN STRENGTH

Preparation of 0.0358 wt % PEC-composition

Stock solutions (0.7 wt %) of the polyelectrolytes were made, which then was diluted to 0.0358 wt %. 0.7 wt % chitosan was dissolved with 1 wt % acetic acid if not anything else is mentioned. The 0.0358 wt % polyelectrolyte solutions were then mixed to the right ratio by pumping the anionic solution to the cationic solution with a peristaltic pump during extensive stirring. The pumping speed was 10 ml/min. Thereafter, the pH was adjusted to 4.2.

Small amount of NaCl was needed for easier dissolution of chitosan (0.058 wt % NaCl in a 0.7 wt % chitosan solution) in some preferred embodiments of the invention; these embodiments are specifically indicated in the tables. The addition of NaCl was however rationalized in more preferred embodiments, since chitosan dissolved excellent in only acid solution. Salt additions can be good for helping electrostatic polymers attach to the fibre but can also be a problem during sheet formation, making sheets weaker.

Charge densities measured with Method 6 for the different polycations and polyanions are presented in Examples 1 and 2, respectively. If nothing else is mentioned, the charge ratio for the PEC used was held to 0.62.

If other techniques of preparing PEC-compositions were used, they are described in the examples below.

Preparation of 1-3 wt % PEC-composition

In most of the examples where PEC has been used as a strength additive to paper, the way of preparing PEC was based on the amount PEC needed for a 3 l batch of pulp suspension This was 0.13-0.15 g PEC for 1% (dry/dry) addition to the fibers (normally 0.141 g). After dividing 0.13-0.15 g on the polycation and the polyanion based on the ratio between them to get the charge ratio 0.62, the polymers were added to 10 g water. To the water mixture, citric acid was added (the amount needed for the test point, normally 4.6-6 times more citric acid mono hydrate than chitosan). The PEC-composition was then homogenized and the whole amount added to the pulp suspension. If several additions of the same PEC-composition were tested, the needed amount PEC for each batch was calculated, summarized and prepared at once. In all PEC where cationic starch was one component, the water mixture was boiled during some minutes while mixing with magnet.

Preparation of High Concentrated PEC-composition

Some tests were done with even higher concentrated PEC-compositions than 3 wt %. How these PEC-solutions were made is described at the relevant example.

Example 1—Charge Densities of Polycations

The charge densities calculated from Method 6 of the polycations are indicated in Table 1. The polyelectrolyte solutions used for these tests were made as 0.0358 wt %.

TABLE 1

| Calculated charge density for polycations. Polycations | | | | |
|---|---|---|---|---|
| Polymer | Commercial name | Supplier | Charge density (meq/g) | Mean |
| Chitosan (citric acid) [3] | Chitosan 90/100/A1 | Kraeber | 5.8 | 5.3 |
| Chitosan practical grade (citric acid) [3] | Chitosan practical grade | Sigma Aldrich | 5.7 | |
| Chitosan, <75% deacetylated (citric acid) [3] | Chitosan, <75% deacetylated | Sigma Aldrich | 5.4 | |
| Chitosan low MW (acetic acid) [3] | Chitosan low MW | Sigma Aldrich | 5.4 | |
| Chitosan medium MW (acetic acid) [3] | Chitosan medium MW | Sigma Aldrich | 4.8 | |
| Chitosan (acetic acid) [3] | Chitosan 90/100/A1 | Kraeber | 4.8 | |
| Polyquaternium 10 | Celquat SC2400 | Akzo Nobel | 2.4 | |
| Polyquaternium 10 | Celquat SC230M | Akzo Nobel | 2.1 | |
| Polyquaternium 4 | Celquat L-200 | Akzo Nobel | 2.1 | |
| Cationic starch | Solbond PC 170MP | Solam/Emsland | 1.4 | |
| Polyquaternium 4 | Celquat H-100 | Akzo Nobel | 0.8 | |
| Cationic starch | Solsize P 85 | Solam/Emsland | 0.6 | |
| Polyquaternium 4/HPC Starch copolymer | Celquat LS-50 | Akzo Nobel | 0.5 | |
| Oxidized cationic starch (Solsize P 85) [4] | [5] — | — | 0.3 | |
| Cationic starch)[1] | Solsize POC 50 | Solam/Emsland | 0.2 | |
| Cationic starch | Solsize POC 1330 | Solam/Emsland | 0.03 | |
| Oxidized cationic starch (Solsize POC 1330) [4] | [5] — | — | 0.015 | |
| Cationic starch[2] | Solbond PC30 | Solam/Emsland | — | |

[1]turbid solution (not optimal for measurement),
[2]too turbid to measure,
[3] the parenthesis shows in what acid the chitosan has been dissolved.
[4] The charge density for the oxidized cationic starch is half the original cationic starch.
[5] No commercial product, since the oxidation was made in lab.

Example 2—Charge Densities of Polyanions

The charge densities calculated from Method 6 of the polyanions are indicated in Table 2. The polyelectrolyte solutions used for these tests were made as 0.0358 wt %.

TABLE 2

| Calculated charge densities for polyanions Polyanions | | | |
|---|---|---|---|
| Polymer | Commercial name | Supplier | Charge density (meq/g) |
| Carrageenan | Genuvisco CG-129 | CP Kelco | 4.0 |
| Alginic acid sodium salt | Alginic acid sodium salt | Sigma Aldrich | 3.6 |
| CMC | FinnFix 2 (FF2) | CP Kelco | 3.5 |
| CMC | FinnFix 5 (FF5) | CP Kelco | 3.3 |
| Alginic acid sodium salt | Alginic acid sodium salt from brown algae | Sigma Aldrich | 3.3 |
| Xanthan gum | Kelzan AP | CP Kelco | 2.2 |
| Lignin alkali | Lignin alkali (Lignin kraft, low sulfonate content) | Sigma Aldrich | 2.0 |
| Pectin | Pectin, from apple/poly-D-galacturonic acid methyl ester | Sigma Aldrich | 1.6 |
| Lignosulfonic acid sodium salt | Lignosulfonic acid sodium salt | Sigma Aldrich | 1.6 |
| NCC | Sonicated NCC, Batch 2014/07/16. Acid hydrolysis (using sulfuric acid) of cellulose | Melodea | 0.2 |

Example 3—Increase in Tensile Strength Generated by Polycations and Polyanions The separate polycations and polyanions comprised in the PEC composition of the present invention were analyzed to determine the increase in tensile strength (%) when applied to 100% OCC according to Method 7. Paper sheets were formed according to Method 8. Tensile tests were conducted according to Method 1.

TABLE 3

The increase in tensile strength for individual polycations and polyanions as strength additives.

| % added (d/d) | Polyelectrolyte | Cation/ Anion | pH ppulp suspen- sion | Time in pulp suspension [min] | Increase in tensile index [%] | Stdv |
|---|---|---|---|---|---|---|
| 1 | FINNFIX 5 [3)] | Anion | <6.5 | 30 | 8.20 | 6.61 |
| 1 | FINNFIX 2 [3)] | Anion | <6.5 | 30 | 14.41 | 5.31 |
| 1 | Alginic acid sodium salt[3)] | Anion | <6.5 | 30 | 12.06 | 4.36 |
| 1 | Lignin. alkali[3)] | Anion | <6.5 | 30 | 11.25 | 6.38 |
| 1 | Xanthan gum[4)] | Anion | <6.5 | 30 | 2.89 | 9.09 |
| 1 | Pectin[3)] | Anion | <6.5 | 30 | 7.77 | 7.57 |
| 1 | Lignosulfonic acid sodium salt[3)] | Anion | <6.5 | 30 | 6.56 | 3.55 |
| 1 | Carrageenan[3)] | Anion | <6.5 | 30 | 6.86 | 10.15 |
| 1 | Chitosan medal mw[1) 2)] | Cation | <6.5 | 30 | 22.41 | 10.55 |
| 1 | Chitosan. 90/100/A1[1) 2)] | Cation | <6.5 | 30 | 19.19 | 7.16 |
| 1 | Celquat SC-240C[3)] | Cation | <6.5 | 30 | 12.57 | 5.57 |
| 1 | Celquat L-200[3)] | Cation | <6.5 | 30 | 4.60 | 5.40 |
| 1 | Solsize P 85 | Cation | <6.5 | 30 | 9.49 | 3.99 |
| 1 | Celquat SC230M | Cation | 8 | 30 | −7.08 | 3.40 |
| 1 | Celquat SC240C | Cation | 8 | 30 | −0.26 | 5.14 |
| 1 | Celquat H-100 | Cation | 8 | 30 | −8.49 | 4.75 |
| 1 | Celquat L-200 | Cation | 8 | 30 | −0.20 | 3.80 |
| 1 | Celquat LS-50 | Cation | 8 | 30 | 2.18 | 6.95 |

[1)]Dissolved in acetic acid.

[2)] 0.7 wt % chitosan dissolved together with 0.058 wt % NaCl and 1 wt % acetic aicd

[3)]1 g polymer was dissolved in 100 g water.

[4)]0.5 g polymer was dissolved in 500 g water.

Example 4—Increase in Tensile Index (%) by Various PEC-systems

Polycations and polyanions were combined as illustrated in Table 4 in order to prepare various PEC compositions. The PEC-compositions used for this test were made as 0.0358 wt %. Some strong polycations were included as cationic part in PEC compositions as well. The increase in tensile strength (%) was compared after producing paper sheets according to Method 7 and 8. Tensile tests were conducted according to Method 1. Acetic acid was used in most PEC compositions in Table 4 except for the final two combinations.

TABLE 4

Increase in tensile index achieved by various PEC-compositions of the invention.

| % added (d/d) | Cation | Anion | Weight ratio (cat./an.) | Charge ratio (theoretical) | Charge density (practical) [meq/g | pH adjusted to | pH pulp suspension | Time in pulp suspension [min] | Increase in tensile index [%] | Stdv |
|---|---|---|---|---|---|---|---|---|---|---|
| 0.15 | chitosan low mw [4) 5)] | FF5 | 1 1 | 0.62 | 0.87 | — | 8 | 30 | 6.01 | 4.10 |
| 0.08 | chitosan low mw [4) 5)] | FF5 | 1 1 | 0.62 | 0.87 | — | 8 | 30 | 6.97 | 1.83 |
| 0.5 | chitosan low mw [4) 5)] | FF5 | 1 1 | 0.62 | 0.87 | — | 8 | 30 | 13.65 | 3.55 |
| 0.5 | chitosan low mw [4) 5)] | FF5 | 1 1 | 0.62 | 1.14 | 4.2 | 7.4 | 30 | 10.14 | 3.25 |
| 1 | chitosan low mw [4) 5)] | FF5 | 1 1 | 0.62 | 1.14 | 4.2 | <6.5 | 30 | 21.51 | 6.97 |
| 3 | chitosan low mw [4) 5)] | FF5 | 1 1 | 0.62 | 1.14 | 4.2 | <6.5 | 30 | 46.68 | 8.20 |
| 1 | chitosan medium mw [4) 5)] | FF2 | 1 1 | 0.62 | 0.92 | 4.2 | <6.5 | 30 | 1.93 | 4.56 |
| 3 | chitosan medium mw [4) 5)] | FF2 | 1 1 | 0.62 | 0.92 | 4.2 | <6.5 | 30 | 44.87 | 9.74 |
| 1 | chitosan medium mw [4) 5)] | alginic acid sodium salt | 1 1 | 0.68 | negative | — | — | 30 | 4.87 | 4.35 |
| 1 | chitosan medium mw [4) 5)] | alginic acid sodium salt | 1 0.70 | 0.48 | 1.04 | 4.4 | <6.5 | 30 | 46.22 | 6.5 |
| 3 | chitosan medium mw [4) 5)] | alginic acid sodium salt | 1 0.70 | 0.48 | 1.04 | 4.4 | <6.5 | 30 | 53.01 | 6.5 |
| 1 | chitosan medium mw [4) 5)] | lignin, alkali | 1 1.85 | 0.70 | 0.80 | 4.2 | <6.5 | 30 | 26.97 | 3.82 |
| 3 | chitosan medium mw [4) 5)] | lignin, alkali | 1 1.85 | 0.70 | 0.80 | 4.2 | <6.5 | 30 | 33.47 | 5.66 |
| 1 | Celquat SC 240C(pq10) | FF5 | 4 1 | 0.41[1)] | 0.90 | 4.2 | <6.5 | 30 | 14.26 | 5.25 |
| 3 | Celquat SC 240C (pq 10) | FF5 | 4 1 | 0.41[1)] | 0.90 | 4.2 | <6.5 | 30 | 23.35 | 7.04 |

TABLE 4-continued

Increase in tensile index achieved by various PEC-compositions of the invention.

| % added (d/d) | Cation | Anion | Weight ratio (cat./an.) | | Charge ratio (theoretical) | Charge density (practical) [meq/g | pH adjusted to | pH pulp suspension | Time in pulp suspension [min] | Increase in tensile index [%] | Stdv |
|---|---|---|---|---|---|---|---|---|---|---|---|
| 1 | Celquat L-200 (pq4) | FF5 | 5 | 1 | 0.33[1)] | 0.7 | 4.2 | <6.5 | 30 | −0.18 | 4.48 |
| 3 | Celquat L-200 (pq4) | FF5 | 5 | 1 | 0.33[1)] | 0.7 | 4.2 | <6.5 | 30 | 6.21 | 3.41 |
| — | chitosan medium mw [4) 5)] | xantha n gum | 1 | 1.5 | 0.62 | Non soluble "PEC-threads" [2)] | — | — | — | — | — |
| 1 | Celquat SC 240C(pq10) | xantha n gum | 1 | 0.56 | 0.62 | 0.83 | 4.4 | <6.5 | 30 | 0.16 | 2.38 |
| 3 | Celquat SC 240C(pq10) | xantha n gum | 1 | 0.56 | 0.62 | 0.83 | 4.4 | <6.5 | 30 | 11.59 | 3.42 |
| 1 | chitosan medium mw[4) 5)] | Pectin | 1 | 2.05 | 0.62 | 0.51 | 4.4 | <6.5 | 30 | 17.73 | 5.95 |
| 3 | chitosan medium mw[4) 5)] | Pectin | 1 | 2.05 | 0.62 | 0.51 | 4.4 | <6.5 | 30 | 47.81 | 12.01 |
| 1 | chitosan medium mw[4) 5)] | lignos ulfonic acid | 1 | 2.05 | 0.62 | 0.54 | 4.4 | <6.5 | 30 | 3.68 | 5.64 |
| 3 | chitosan medium mw[4) 5)] | lignos ulfonic acid | 1 | 2.05 | 0.62 | 0.54 | 4.4 | <6.5 | 30 | 39.13 | 7.87 |
| 1 | chitosan practical grade[4)6)] | FF5 | 1 | 1 | 0.62 | — | 3.3 | <6.5 | 30 | 42.31 | 10.11 |
| 1 | chitosan >75% deacetylated[4) 6)] | FF5 | 1 | 1 | 0.62 | — | 3.3 | <6.5 | 30 | 29.61 | 9.28 |

[1)]Kept low due to economical reasons,
[2)] The formed PEC was not soluble in weak acidic solution,
[4)]0.7 wt % dissolved together with 0.058 wt % NaCl,
[5)] Dissolved in acetic acid,
[6)]Dissolved in citric acid By comparing table 4 row 10 with table 3 row 9 one can see that approximately a doubling of the increase in tensile index [%] is achieved using 40% less chitosan.

By comparing table 3 row 9 with table 4 row 5 one can see that half of the amount of chitosan can be substituted with CMC in the PEC composition of the invention and still maintain similar increase in tensile index [%]. This means that using PEC-composition as strength additive will result in lower price per percent tensile index increase as compared to using only chitosan.

Example 5—Comparison Between Citric Acid and Acetic Acid 0.7 wt % chitosan was dissolved in 3.27 wt % citric acid monohydrate and 0.0358 wt % PEC-solutions (consisting of chitosan and four different polyanion) were prepared. 1% (d/d) PEC was added to pulp suspension according to Method 7 and paper sheets were formed according to Method 8. Tensile tests were conducted according to Method 1. Table 5 shows the results compared with the results from PEC-compositions made using chitosan dissolved in acetic acid instead of citric acid monohydrate.

TABLE 5

Comparison between PEC made from chitosan dissolved in citric acid monohydrate and acetic acid. The test series can be directly compared. 100% OCC.

| | % added (d/d) | Cation | Anion | Weight ratio (cat./an.) | | pH PEC-solution | Increase in tensile index [%] | stdv |
|---|---|---|---|---|---|---|---|---|
| Citric acid monohydrate | 1 | chitosan 90/100/A1 [3)] | alginic acid sodium salt | 1 | 0.70 | 3.30[1)] | 25.09 | 9.85 |
| | 1 | chitosan 90/100/A1 [3)] | FF5 | 1 | 1 | 3.24[1)] | 42.14 | 10.73 |
| | 1 | chitosan 90/100/A1 [3)] | lignin alkali | 1 | 1.85 | 3.55[1)] | 23.63 | 5.30 |
| | 1 | chitosan 90/100/A1 [3)] | lignosulfonic acid sodium salt | 1 | 2.05 | 3.54[1)] | 18.93 | 3.92 |
| Acetic acid | 1 | chitosan medium [3)] | alginic acid sodium salt | 1 | 0.70 | 4.2 | 38.39 | 8.41 |

TABLE 5-continued

Comparison between PEC made from chitosan dissolved in citric acid monohydrate and acetic acid. The test series can be directly compared. 100% OCC.

| % added (d/d) | Cation | Anion | Weight ratio (cat./an.) | | pH PEC-solution | Increase in tensile index [%] | stdv |
|---|---|---|---|---|---|---|---|
| 1 | chitosan low mw 3) | FF5 | 1 | 1 | 4.2 | 21.51 | 6.97 |
| 1 | chitosan medium mw 3) | lignin, alkali | 1 | 1.85 | 4.2 | 26.97 | 3.80 |
| 1 | chitosan medium mw 3) | lignosulfonic acid sodium salt | 1 | 2.05 | 4.2 | 22.00 | 5.64 |

1)The pH became when <4 when the titration was finished, so no pH adjustment was needed.
2) Data also shown in Table 4,
3) 0.7 wt % chitosan dissolved together with 0.058 wt % NaCl.

Due to the above results, chitosan was in preferred embodiments of the invention dissolved in citric acid monohydrate and not in acetic acid. Moreover, acetic acid being very volatile and having a pungent smell are two further disadvantages of using acetic acid.

Example 6—Proportion Between Chitosan and Citric Acid Monohydrate

To find the best proportion between chitosan and citric acid monohydrate, an analysis with different amounts of acid was performed as indicated in Table 6. Here, 0.141 g PEC was homogenized with the given amount citric acid monohydrate in 10 g water, according to the method of producing 1-3 wt % PEC-composition. Pulp suspension was made according to Method 7 and paper sheets were formed according to Method 8. Tensile tests were conducted according to Method 1.

TABLE 6

Changes in tensile index resulting from PEC-compositions prepared using given amounts of citric acid monohydrate. 100% OCC.

| % added (d/d) | Cation | Anion | Weight ratio (cat./an.) | | Amount of citric acid mono hydrate relative to chitosan | Increase in tensile index [%] | stdv |
|---|---|---|---|---|---|---|---|
| 1 | chitosan 90/100/A1 | FF5 | 1 | 1 | 1 | −4.25 | 6.45 |
| 1 | chitosan 90/100/A1 | FF5 | 1 | 1 | 2 | 10.54 | 3.31 |
| 1 | chitosan 90/100/A1 | FF5 | 1 | 1 | 3 | 16.58 | 11.78 |
| 1 | chitosan 90/100/A1 | FF5 | 1 | 1 | 4 | 23.92 | 6.33 |
| 1 | chitosan 90/100/A1 | FF5 | 1 | 1 | 5 | 24.90 | 6.71 |
| 1 | chitosan 90/100/A1 | FF5 | 1 | 1 | 6 | 33.39 | 11.92 |
| 1 | chitosan 90/100/A1 | FF5 | 1 | 1 | 4.28 | 30.29 | 7.82 |

Example 7—Concentration of PEC-solution—Alginic Acid Sodium Salt Used as Anion Procedure 1: The first test with high concentrated PEC-solutions was performed with chitosan and alginic acid sodium salt. Solutions of 10.8 wt % chitosan (in acetic acid) and 12.2 wt % alginic acid sodium salt were mixed one by one manually (due to their very high viscosity), and then kneaded together with the right proportions (so that chitosan:alginic acid sodium salt became 1:0.7). The final PEC solution became 11.5 wt % and its texture was like a thick gel. Then, 1 g of the PEC-solution was homogenized in 99 g water. The results are presented in Table 7. The pulp suspension was produced according to Method 7 and paper sheets were produced according to Method 8. Tensile tests were conducted according to Method 1.

TABLE 7

Results of concentrated (11.5 wt %) PEC of chitosan and alginic acid sodium salt. 100% OCC. Procedure 1

| % added (did) | Cation | Anion | Weight ratio (cat./an.) | | Increase in Tensile Index [%] | stdv |
|---|---|---|---|---|---|---|
| 1 | chitosan medel1) | alginic acid sodium salt | 1 | 0.7 | 38.39 | 8.41 |
| 1 | chitosan 90/100/A1 1) | alginic acid sodium salt | 1 | 0.7 | 26.85 | 11.23 |

1) 0.7 wt % chitosan dissolved together with 0.058 wt % NaCl.

In table 7 row 1 is the reference (PEC-composition with 0.0358 wt %), row 2 PEC composition 11.5 wt %

Procedure 2: The second test with high concentrated PEC-solutions was to dehydrate 0.0358 wt % PEC-solutions (based on stock solution of 0.7 wt % chitosan dissolved in 3 wt % citric acid) using oven at 90-100° C. for 5 hours, grind the formed film and dissolve the resulting powder in water (first by boiling 0.08 g dehydrated PEC in 80 g water and then diluting it to 0.0358 wt % PEC-composition once again). The pulp suspension was produced according to Method 7 and paper sheets were produced according to Method 8. Tensile tests were conducted according to Method 1. The results are seen in Table 8.

TABLE 8

Results from PEC-solutions dried in oven and re-dissolved in water. Reference series are found in Table 3. 100% OCC. Procedure 2.

| % added (did) | Cation | Anion | Weight ratio (cat./an.) | | Increase in Tensile Index [%] | stdv |
|---|---|---|---|---|---|---|
| 1 | chitosan 90/100/A1 [1)] | alginic acid sodium salt | 1 | 0.7 | 11.96 | 6.55 |
| 1 | chitosan 90/100/A1 [1)] | FF5 | 1 | 1 | 10.15 | 7.35 |
| 1 | chitosan 90/100/A1 [1)] | lignin alkali | 1 | 1.85 | 21.29 | 6.62 |
| 1 | chitosan 90/100/A1 [1)] | lignosulfonic acid | 1 | 2.05 | 19.97 | 4.64 |

[1)] 0.7 wt % chitosan dissolved together with 0.058 wt % NaCl

Procedure 3: A third test was performed omitting water by blending powders of cation (chitosan), anion (four different) in weight ratios according to table 9 and citric acid mono hydrate in amount of 4.29 times the amount of the used chitosan. This is referred to as dry powder blend of "100 wt % PEC". 0.141 g powder blend was then homogenized in 10 g water to yield the ready to use PEC-composition.

Procedure 4: An alternative procedure is to omit the acid and the water and add them to the dry powder blend of the cation and anion under homogenization prior use. The pulp suspension was produced according to Method 7 and paper sheets were produced according to Method 8. Tensile tests were conducted according to Method 1. The results are seen in Table 9.

TABLE 9

Results from tests where the polyelectrolytes were mixed as powders before addition to water. 100% OCC. Procedure 3 and procedure 4.

| % added (d/d) | Cation | Anion | Weight ratio (cat./an.) | | Time in pulp suspension [min] | Increase in Tensile Index [%] | stdv |
|---|---|---|---|---|---|---|---|
| 1 | chitosan 90/100/A1 | alginic acid sodium salt | 1 | 0.7 | 30 | 21.2[1)] | 8.38 |
| 1 | chitosan 90/100/A1 | FF5 | 1 | 1 | 30 | 36.1[1)] | 7.84 |
| 1 | chitosan 90/100/A1 | lignin alkali sodium salt | 1 | 1.85 | 30 | 21.4[1)] | 6.82 |
| 1 | chitosan 90/100/A1 | lignosulfonic acid | 1 | 2.05 | 30 | 19.5[1)] | 8.69 |
| 1 | chitosan 90/100/A1 | alginic acid sodium salt low MW | 1 | 0.7 | 30 | 29.7[1)] | 8.68 |
| 1 | chitosan 90/100/A1 | FF5 | 1 | 1 | 30 | 30.29[2)] | 7.82 |

[1)]PEC-composition prepared according to procedure 3.
[2)]PEC-composition prepared according to procedure 4.

Procedure 5a and 5b: PEC compositions were also made with cationic starch as polycation. Cationic starch does not dissolve in cold water, so mixtures with cationic starch and CMC or lignosulfonic acid sodium salt in cold water were prepared. The solid contents became 55.6 wt % and 61.75 wt %, respectively. The texture of these was like opaque yoghurt. 1 part of the solution(s) was then mixed with 9 parts (5a) or 1 part water (5b) and boiled. The opaque solutions then became clear. The pulp suspension was produced according to Method 7 and paper sheets were produced according to Method 8. Tensile tests were conducted according to Method 1. The results are shown in Table 10. No citric acid was added.

TABLE 10

Results from production of PEC compositions by mixing cationic starch (uncooked) and polyanion in cold water to a very high solid content. 100% OCC.

| % added (d/d) | Cation | Anion | Weight ratio (cat./an.) | | Increase in Tensile Index [%] | stdv |
|---|---|---|---|---|---|---|
| 1 | SOLSIZE P 85 | FF5 | 1 | 0.11 | 18.82[1)] | 8.38 |
| 1 | SOLSIZE P 85 | Lignosulfonic acid sodium salt | 1 | 0.235 | 9.58[1)] | 3.86 |
| 0.1 | SOLSIZE P 85 | FF5 | 1 | 0.11 | 17.80[2)] | 4.50 |
| 0.2 | SOLSIZE P 85 | FF5 | 1 | 0.11 | 24.38[2)] | 4.21 |
| 0.3 | SOLSIZE P 85 | FF5 | 1 | 0.11 | 17.31[2)] | 6.82 |
| 0.5 | SOLSIZE P 85 | FF5 | 1 | 0.11 | 18.09[2)] | 4.04 |
| 0.7 | SOLSIZE P 85 | FF5 | 1 | 0.11 | 22.52[2)] | 3.42 |
| 1 | SOLSIZE P 85 | FF5 | 1 | 0.11 | 35.39[2)] | 8.20 |

[1)]1 part PEC mixed with 9 parts water, procedure 5a.
[2)]1 part PEC mixed with 1 part water. procedure 5b Example 8—Cationic Starch as Cation Table 11 shows the results from when the best PEC's with chitosan were changed to the cationic starch SOLSIZE P 85. The cationic starch SOLSIZE P 85 was chosen due to its relatively high charge density. An analysis of different amounts citric acid was done. The polyelectrolyte powders (0.141 g) and acid were added to water (10 g) and then boiled during magnet stirring (according to method for preparing 1-3 wt % PEC-composition) The solutions became clear. The pulp suspension was produced according to Method 7 and paper sheets were produced according to Method 8. Tensile tests were conducted according to Method 1.

TABLE 11

PEC with cationic starch as poly cation. The different amounts of citric acid are pointed out. 100% OCC.

| % added (d/d) | Cation | Anion | Weight ratio (cat./an.) | | Amount of citric acid mono hydrate relative to chitosan[1)] | Increase in tensile index [%] | stdv |
|---|---|---|---|---|---|---|---|
| 1 | SOLSIZE P 85 | lignin, alkali | 1 | 0.190 | 2.1 | 15.84 | 6.92 |
| 1 | SOLSIZE P 85 | lignosulf-onic acid | 1 | 0.235 | 2.1 | 18.74 | 5.71 |
| 1 | SOLSIZE P 85 | FF5 | 1 | 0.113 | 2.1 | 21.98 | 8.18 |
| 1 | SOLSIZE P 85 | Pectin | 1 | 0.235 | 2.1 | 17.83 | 3.22 |
| 1 | SOLSIZE P 85 | FF5 | 1 | 0.113 | 0 | 21.85 | 3.13 |
| 1 | SOLSIZE P 85 | FF5 | 1 | 0.113 | 0.7 | 16.70 | 6.42 |
| 1 | SOLSIZE P 85 | FF5 | 1 | 0.113 | 1.4 | 14.36 | 4.95 |
| 1 | SOLSIZE P 85 | FF5 | 1 | 0.113 | 2.1 | 21.98 | 8.18 |
| 1 | SOLSIZE P 85 | FF5 | 1 | 0.113 | 4.2 | 17.20 | 5.24 |
| 1 | SOLSIZE P 85 | lignosulfonic acid | 1 | 0.113 | 0 | 17.16 | 5.44 |
| 1 | SOLSIZE P 85 | lignosulfonic acid | 1 | 0.235 | 4.2 | 16.88 | 5.78 |

[1)]As if chitosan was 50% of the PEC

It can be seen that exchanging chitosan to cationic starch reduces the increase in tensile index with about half, compare table 5 with table 11.

In other embodiments, Solbond PC 170MP which is a cationic starch having a higher charge density than Solsize P 85 was tested. The same procedure for making PEC was followed (i.e. preparation of 1-3 wt % PEC-composition including boiling of the starch), but the PEC using Solbond PC 170MP behaved differently, fluffy particles were formed within short time and the solution was milky, in comparison to the lower charged Solsize P 85 cationic starch with which clear PEC solutions were obtained. The pulp suspension was produced according to Method 7 and paper sheets were produced according to Method 8. Tensile tests were conducted according to Method 1. The results are shown in Table 12.

TABLE 12

PEC with high charged cationic starch as poly cation. 100% OCC

| % added (d/d) | Cation | Anion | Weight ratio (cat./an.) | Amount of citric acid mono hydrate relative to chitosan | Increase in tensile index [%] | Stdv |
|---|---|---|---|---|---|---|
| 1 | Solbond PC 170MP | lignosulfonic acid | 1 0.56 | 0 | 12.91 | 4.28 |
| 1 | Solbond PC 170MP | FF5 | 1 0.27 | 0 | 10.39 | 4.87 |

Example 9—Amount of PEC to Pulp Suspension

Different amounts of PEC were added to pulp suspension of 80% OCC and 20% newspaper. One series was made with only citric acid (the amount needed to lower the pH to <6.5) to see the impact of the citric acid, see table 17 row 1. PEC was prepared as 2.7 wt % solution with 4.2 times more citric acid mono hydrate than chitosan for dissolution of chitosan (according to the method for preparation of 1-3 wt % PEC-composition). The pulp suspension was produced according to Method 7 and paper sheets were produced according to Method 8. Tensile tests were conducted according to Method 1. Results are shown in Table 13.

TABLE 13

PEC with chitosan and CMC added in different amounts to the pulp suspension. 80% OCC. 20% newspaper.

| % added (d/d) | Cation | Anion | Weight ratio (cat./an.) | Increase in tensile index [%] | Stdv |
|---|---|---|---|---|---|
| 0[1)] | — | — | — — | 16.14 | 3.93 |
| 0.2 | chitosan 90/100/A1 | FF5 | 1 1 | 18.64 | 6.68 |
| 0.3 | chitosan 90/100/A1 | FF5 | 1 1 | 21.18 | 9.32 |
| 0.5 | chitosan 90/100/A1 | FF5 | 1 1 | 29.80 | 5.44 |
| 1 | chitosan 90/100/A1 | FF5 | 1 1 | 53.60 | 10.16 |

[1)] Only citric acid monohydrate dissolved in water to lower the pH to <6.5 was added to the pulp suspension From table 13 it can be concluded that even using very small amounts of PEC large increase in tensile index can be observed.

Example 10—White Water and a Closed Rapid Köthen System

In the examples until now paper sheets were formed with Rapid Köthen using fresh tap water for each run. In order to simulate industrial conditions the tap water was exchanged to white water and the white water in the system was not exchanged but reused in a closed system. The white water was received from a paper mill using recycled paper for production of paper.

White water contained a lot of ash and other suspended particles, the ordinary stainless steel wire (mesh 150) was changed to a cupper bronze wire (mesh 100) in order to prevent particles from getting stuck in the wire. Moreover, The Rapid When was rebuilt to a closed system with no fresh water intake, i.e. closed system. The pH and charge in the white water were measured between every pair of test points.

The tests were performed with PEC compositions of varying concentrations PEC and comprising chitosan and CMC. The PEC-compositions were produced according to the method of preparing 1-3 wt % PEC-composition.

TABLE 14

Pulp suspension made of white water. 0.3-3% PEC added. 80% OCC and 20% newspaper.

| Run number | Cation | Anion | Weight ratio (cat./an.) | pH | Charge[1)] [mV] | % PEC (d/d) | Mean Tensile Index [Nm/g] | Stdv | Increase in tensile index [%] | Stdav |
|---|---|---|---|---|---|---|---|---|---|---|
| Check | | | | 5.05 | −67 | | | | | |
| Reference | | | | | | | 28.33 | 2.32 | | |
| Check | | | | 5.08 | −57 | | | | | |
| Run 1 | chitosan 90/100/A1 | FF5 | 1 1 | | | 0.3 | 31.29 | 1.66 | 10.47 | 5.86 |
| Check | | | | 5.09 | −54 | | | | | |
| Run 2 | chitosan 90/100/A1 | FF5 | 1 1 | | | 0.5 | 32.03 | 1.31 | 13.09 | 4.62 |
| Check | | | | 5.1 | −50 | | | | | |
| Run 3 | chitosan 90/100/A1 | FF5 | 1 1 | | | 0.7 | 33.55 | 1.23 | 18.44 | 4.34 |
| Check | | | | 5.11 | −52 | | | | | |
| Run 4 | chitosan 90/100/A1 | FF5 | 1 1 | | | 2.0 | 37.39 | 1.29 | 31.97 | 4.56 |
| Check | | | | 5.12 | −47 | | | | | |
| Run 5 | chitosan 90/100/A1 | FF5 | 1 1 | | | 3.0 | 39.02 | 1.48 | 37.76 | 5.21 |
| Check | | | | 5.11 | −33 | | | | | |

[1)] White water charge

It is shown that the amount of PEC required for reaching similar increase in tensile index when forming the sheet in white water compared to tap water is approx. 3-4 times higher. Nevertheless, the performance and effectivity of PEC compositions is obvious even in extremely dirty white water systems, where low additions such as 0.3% PEC d/d still yields an increase of 10.47% in tensile index.

Example 11—Different Charge Ratios

The effect of charge ratios was investigated for PEC compositions comprising i) chitosan and alginic acid sodium salt, and (ii) chitosan and CMC was investigated.

The charge ratios 0.37, 0.48, 0.58 and 0.68 were tested for PEC compositions comprising chitosan and alginic acid sodium salt. Solutions were made according to the method of producing 0.0358 wt % PEC-composition. The pulp suspension was produced according to Method 7 and paper sheets were produced according to Method 8. Tensile tests were conducted according to Method 1.

TABLE 15

PEC of chitosan/alginic acid sodium salt with sheets formed in tap water. 100% OCC.

| % added (d/d) | Cation | Anion | Weight ratio (cat./an.) | Charge ratio (theoretical) | Charge density (practical) [meq/g] | pH PEC solution | Increase in tensile index [%] | Stdv |
|---|---|---|---|---|---|---|---|---|
| 1 | chitosan medium mw | alginic acid sodium salt | 1 1 | 0.68 | Neg[1)] | 4.2 | 4.87 | 4.35 |
| 1 | chitosan medium mw | alginic acid sodium salt | 1 0.55 | 0.37 | 1.54 | 4.4 | 37.32 | 7.80 |
| 3 | chitosan medium mw | alginic acid sodium salt | 1 0.55 | | 1.54 | 4.4 | 37.79 | 4.68 |
| 1 | chitosan medium mw | alginic acid sodium salt | 1 0.70 | 0.48 | 1.04 | 4.4 | 38.39 | 8.41 |
| 3 | chitosan medium mw | alginic acid sodium salt | 1 0.70 | | 1.04 | 4.4 | 58.72 | 10.33 |
| 1 | chitosan medium mw | alginic acid sodium salt | 1 0.85 | 0.58 | 0.49 | 4.4 | 26.69 | 7.92 |
| 3 | chitosan medium mw | alginic acid sodium salt | 1 0.85 | | 0.49 | 4.4 | 42.04 | 8.11 |

[1)]Complex became negatively charged due to too high amount of anion in relation to cation was used to form PEC.

For PEC compositions comprising chitosan and CMC, the initial PEC composition was made with charge ration 0.62 and adjusted 0.1 higher and 0.1 lower. Solutions were made according to the method of producing 1-3 wt % PEC-composition. The pulp suspension was produced according to Method 7 and paper sheets were produced according to Method 8. Tensile tests were conducted according to Method 1. The results are shown in Table 16.

TABLE 16

PEC of Chitosan and FF5 with different charge ratios in tap water. 80% OCC. 20% newspaper.

| % added (d/d) | Cation | Anion | Weight ratio (cat./an.) | Charge ratio (theoretical) | Increase in tensile index [%] | Stdv |
|---|---|---|---|---|---|---|
| 0.2 | chitosan 90/100/A1 | FF5 | 1 1 | 0.62 | 18.6 | 6.7 |
| 0.3 | chitosan 90/100/A1 | FF5 | 1 1 | | 21.2 | 9.3 |
| 0.5 | chitosan 90/100/A1 | FF5 | 1 1 | | 29.8 | 5.4 |

TABLE 16-continued

PEC of Chitosan and FF5 with different charge ratios in tap water. 80% OCC. 20% newspaper.

| % added (d/d) | Cation | Anion | Weight ratio (cat./an.) | Charge ratio (theoretical) | Increase in tensile index [%] | Stdv |
|---|---|---|---|---|---|---|
| 1 | chitosan 90/100/A1r | FF5 | 1 1 | | 53.6 | 10.2 |
| 0.5 | chitosan 90/100/A1 | FF5 | 1 1.15 | 0.72 | 23.19 | 9.62 |
| 0.7 | chitosan 90/100/A1 | FF5 | 1 1.15 | | 29.20 | 10.74 |
| 1 | chitosan 90/100/A1 | FF5 | 1 1.15 | | 35.66 | 8.13 |
| 0.5 | chitosan 90/100/A1 | FF5 | 1 0.83 | 0.52 | 19.13 | 8.52 |
| 0.7 | chitosan 90/100/A1 | FF5 | 1 0.83 | | 20.35 | 9.41 |

TABLE 16-continued

PEC of Chitosan and FF5 with different charge ratios in tap water. 80% OCC. 20% newspaper.

| % added (d/d) | Cation | Anion | Weight ratio (cat./an.) | Charge ratio (theoretical) | Increase in tensile index [%] | Stdv |
|---|---|---|---|---|---|---|
| 1 | chitosan 90/100/A1 | FF5 | 1 0.83 | | 29.09 | 7.33 |

Based on the results presented in tables 15 and 16 it is obvious that different anions have different optimal charge ratio.

Example 12—Wet Strength

The wet strength of papers produced in lab were subjected to comparative experiments. Wet strength is a measurement do determine whether a binder/additive such as a PEC composition is capable of resisting the expansion that the fibres are undergoing while exposed to damp environment.

Pulp suspension was produced according to Method 7 and paper sheets were produced according to Method 8. Tensile tests in dry and wet conditions were conducted according to Method 1 and 2, respectively.

Wet strength was measured for two different PEC compositions; chitosan/FF5 (PEC1) and cationic starch/FF5 (PEC2). See results from wet tensile test in Table 17. Chitosan is chitosan 90/100/A1 and cationic starch is Solsize P 85.

TABLE 17

A comparison of wet and dry strength for PEC 1 and PEC 2

| | Amount PEC [%] | WET Mean tensile index [Nm/g] | WET stdv | WET Mean increase in tensile index (%) | WET stdv | DRY Mean tensile index [Nm/g] | DRY stdv | DRY Mean increase in tensile index (%) | DRY stdv | Ratio wet/dry |
|---|---|---|---|---|---|---|---|---|---|---|
| PEC 1 | 0 | 3.21 | 0.52 | | | 28.33 | 2.32 | | | 11.3 |
| | 0.3 | 4.33 | 0.45 | 34.94 | 14.06 | 31.29 | 1.66 | 10.47 | 5.86 | 13.9 |
| | 0.5 | 4.86 | 0.31 | 51.19 | 9.55 | 32.03 | 1.31 | 13.09 | 4.62 | 15.2 |
| | 0.7 | 5.63 | 0.64 | 75.23 | 19.92 | 33.55 | 1.23 | 18.44 | 4.34 | 16.8 |
| | 2 | 7.25 | 0.94 | 129.00 | 30.53 | 37.39 | 1.29 | 31.97 | 4.56 | 19.4 |
| | 3 | 8.94 | 0.74 | 178.17 | 23.19 | 39.02 | 1.48 | 37.76 | 5.21 | 22.9 |
| PEC 2 | 0 | 3.13 | 0.39 | | | 30.02 | 0.88 | | | 10.4 |
| | 0.3 | 3.41 | 0.28 | 9.00 | 8.79 | 29.93 | 1.50 | −1.29 | 3.63 | 11.4 |
| | 0.5 | 3.34 | 0.39 | 6.73 | 12.54 | 30.17 | 1.36 | 0.50 | 4.53 | 11.1 |
| | 0.7 | 2.63 | 0.49 | −15.97 | 15.61 | 30.51 | 2.85 | 1.63 | 9.48 | 8.6 |
| | 2 | 3.02 | 0.49 | −3.38 | 15.74 | 32.20 | 1.48 | 7.27 | 4.95 | 9.4 |
| | 3 | 2.90 | 0.18 | −7.39 | 5.82 | 30.92 | 2.45 | 7.04 | 4.58 | 9.4 |

As indicated in the above table, the wet strength is increased with PEC containing chitosan but not with starch. Around 20% strength remains in wet condition for 1% added PEC (see ratio wet/dry).

Example 13—Stability and Mold Development

The viscosity and stability of various concentrations of PEC compositions comprising various ratios between chitosan, CMC and citric acid was tested for about 4 months.

Figure 2:
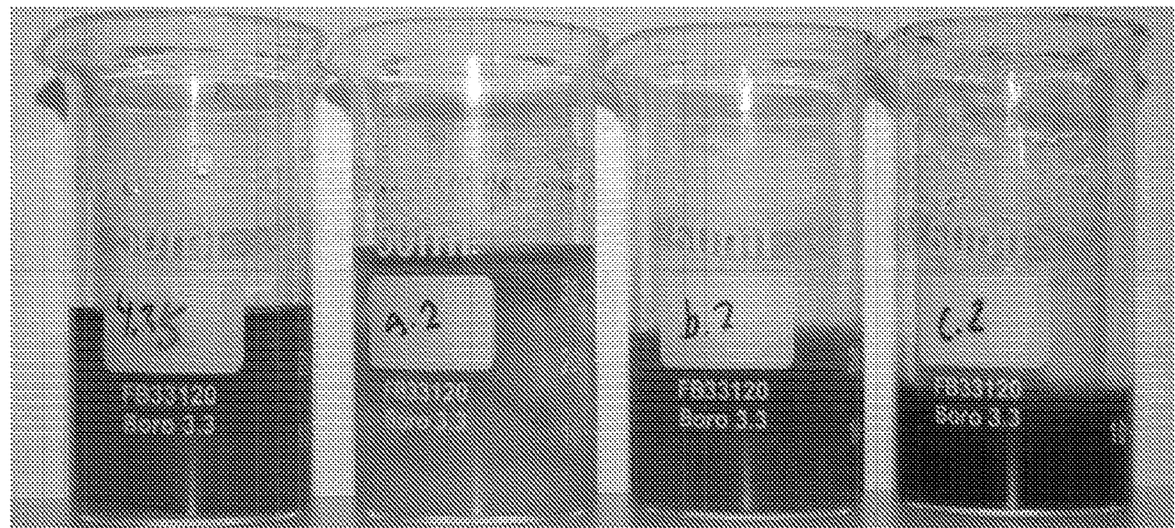
FIG. 2—PEC compositions having 1, 2, 4 and 6 wt % PEC (left to right). All compositions comprise chitosan: CMC:citric acid mono hydrate with the ratio 1:1:6.

The formulations illustrated in FIG. 2 have 1, 2, 4 and 6 wt % PEC (left to right in FIG. 2) and the chitosan:CMC: citric acid mono hydrate ratio was 1:1:6. Although, the formulations were opaque white to light yellow after production, all formulations (even the low concentrations) adopted a dark yellow colour and also developed mold over a time of 4 months A test was conducted where PEC composition comprising chitosan:CMC:citric acid mono hydrate with the weight ratio 1:1:6 and 4 wt % PEC with and without the preservative 0.2 wt % Nipacide BSM were produced. The formulations were stored at 8° C., 23° C. and 40° C. and the change in colour and mold growth were compared over time. The formulations including a preservative showed no issues with mold growth (at 8° C., 23° C. and 40° C.) and a very slight darkening of the formulation colours occurs for formulations stored at 23° C. and 40° C. but can be avoided if formulation is stored at 8° C.

Summary of Examples 1-13

The experiments showed that there were no problems with preparing PEC in tap water.

It has been shown that it is possible to prepare PEC compositions in high concentrations such as 11-13 wt % and subsequently dilute these to low concentration prior use.

PEC compositions with chitosan as polycation are superior when it comes to tensile index increase. Moreover, PEC compositions with chitosan/alginic acid sodium salt or chitosan/CMC give highest increase in tensile strength. The option to be able to choose between high performance polyanions such as Finnfix 5 (CMC), lignin and alginic acid sodium salt, give the possibility to the manufacturer of the PEC compositions to adjust the price level of the final composition.

It is furthermore obvious that different polyanions in the PEC composition requires different acids to perform at their best. PEC containing chitosan and CMC is performing better using citric acid monohydrate while PEC containing chitosan and alginic acid sodium salt performance better using acetic acid.

PEC with chitosan as poly cation is pH sensitive as illustrated in the photograph in FIG. 1 wherein the pH values are 4, 5, 6, 6.3, 6.7 and 7 from left to right. The sedimentation that occurs in pH 7 happens instantly.

It has been demonstrated that PEC compositions containing chitosan added to paper give rise to wet strength.

To produce a stable PEC composition a preservative is included in the formulation which protects the formulation from mold growth and storing it at a cool place is protecting the formulation from colour change.

Examples 14-25—Binder Recipes

As indicated in the previous examples, PEC compositions comprising chitosan and CMC show good wet strength and dry strength on paper based materials.

In Examples 14-25, experiments were conducted on nonwovens and filter paper in order to develop several embodiments of PEC compositions having:

high tensile strengths and high tensile stiffness, or
high tensile strengths and low tensile stiffness, or
low tensile strengths and low tensile stiffness, or
low tensile strengths and high tensile stiffness.

Hence, depending on the characteristic (i.e. high/low tensile strength and high/low tensile stiffness) that one would like to exert on a nonwoven or paper-based material, one can choose an embodiment of a PEC composition which can provide said characteristic.

Compositions a, b, c, h, c1, c2, c3, h1, C/GA, C/NCC and BB27 listed below in Table 22 were developed in order to exert various combinations of tensile strengths and tensile stiffness on nonwovens and paper-based substrates. Composition a is not a PEC composition and said non-PEC composition was prepared to compare their characteristics with PEC composition b, c and h.

TABLE 18

| Binder recipes | | |
|---|---|---|
| | | % |
| a | solid content | 14.20 |
| | Chitosan 90/100/A1 | 2.00 |
| | Citric acid mono hydrate | 12.00 |
| | Nipacide BSM | 0.20 |
| | $H_2O$ | 85.80 |
| | SUM | 100.00 |
| b | solid content | 14.00 |
| | FF5 | 1.00 |
| | Chitosan 90/100/A1 | 1.00 |
| | Citric acid mono hydrate | 12.00 |
| | Nipacide BSM | 0.2 |
| | $H_2O$ | 85.80 |
| | SUM | 100.00 |
| c | solid content | 28.00 |
| | FF5 | 0.75 |
| | Chitosan 90/100/A1 | 0.75 |
| | Citric acid monohydrate | 9.00 |
| | Neosorb 70/70 | 25.00 |
| | Nipacide BSM | 0.2 |
| | $H_2O$ | 64.35 |
| | SUM | 100.00 |
| C/GA | solid content | 4.73 |
| | Agri-spray (gum arabic) | 1.55.00 |
| | Chitosan 90/100/A1 | 0.45.00 |
| | Citric acid mono hydrate | 2.73.00 |
| | Nipacide BSM | 0.2 |
| | $H_2O$ | 95.10 |
| | SUM | 100.00 |
| C/NCC | solid content | 3.44 |
| | NCC | 2.88 |
| | Chitosan 90/100/A1 | 0.08 |
| | Citric acid mono hydrate | 0.48 |
| | Nipacide BSM | 0.2 |
| | $H_2O$ | 96.4 |
| | SUM | 100.00 |
| BB27 | solid content | 16.00 |
| | FF5 | 2.00 |
| | Chitosan 90/100/A1 | 2.00 |
| | Citric acid mono hydrate | 12.00 |
| | Nipacide BSM | 0.2 |
| | $H_2O$ | 83.80 |
| | SUM | 100.00 |
| h | solid content | 21.00 |
| | FF5 | 0.875 |
| | Chitosan 90/100/A1 | 0.875 |
| | Citric acid monohydrate | 10.50 |
| | Neosorb 70/70 | 12.50 |
| | Nipacide BSM | 0.2 |
| | $H_2O$ | 87.75 |
| | SUM | 100.000 |

c1 = 10 wt % of c
c2 = 9.33 wt % of c
c3 = 14.0 wt % of c
h1 = 10 wt % of h

The preservative used in the above examples is referred to as Nipacide BSM and comprises a mixture of 1,2-benzisothiazolin-3-one (2.5%) and 2-methyl-4-isothiazolin-3-one (2.5%) and controls the growth of bacteria and fungi (mold). However, either one of 1,2-benzisothiazolin-3-one and 2-methyl-4-isothiazolin-3-one may be used in PEC-compositions. 2-methyl-4-isothiazolin-3-one is a cosmetic preservative and can optionally be exchanged with other cosmetic preservatives.

Additionally, preservatives comprising 1,2-benzisothiazolin-3-one and 2-methyl-4-isothiazolin-3-one, as well as further preservatives such as 2-Bromo-2-nitro-1,3-propanediol may also be included in the PEC-compositions for inhibiting mold. This combination of compounds is referred to as Acticide MBT 1. Other biocides being possible to use are Acticide MBS and Acticide MBL.

2-Bromo-2-nitro-1,3-propanediol is used in cosmetics and pharmaceuticals and can be used alone in the PEC-compositions. Moreover, it may optionally be exchanged with other preservatives used in cosmetics, food and pharmaceuticals.

Example 14—Dry Properties of Nonwoven Material

The aim of this experiment was to identify the PEC composition which provides the softest (lowest tensile stiffness value) nonwoven material but wherein the nonwoven material also has good dry tensile index and suitable strain. This is a specification for a typical napkin product.

Hydro entangled nonwoven (Polyester/Viscose 50/50) was used as substrate to evaluate the stiffness and elongation changes of materials treated by different PEC-compositions.

Figure 3:
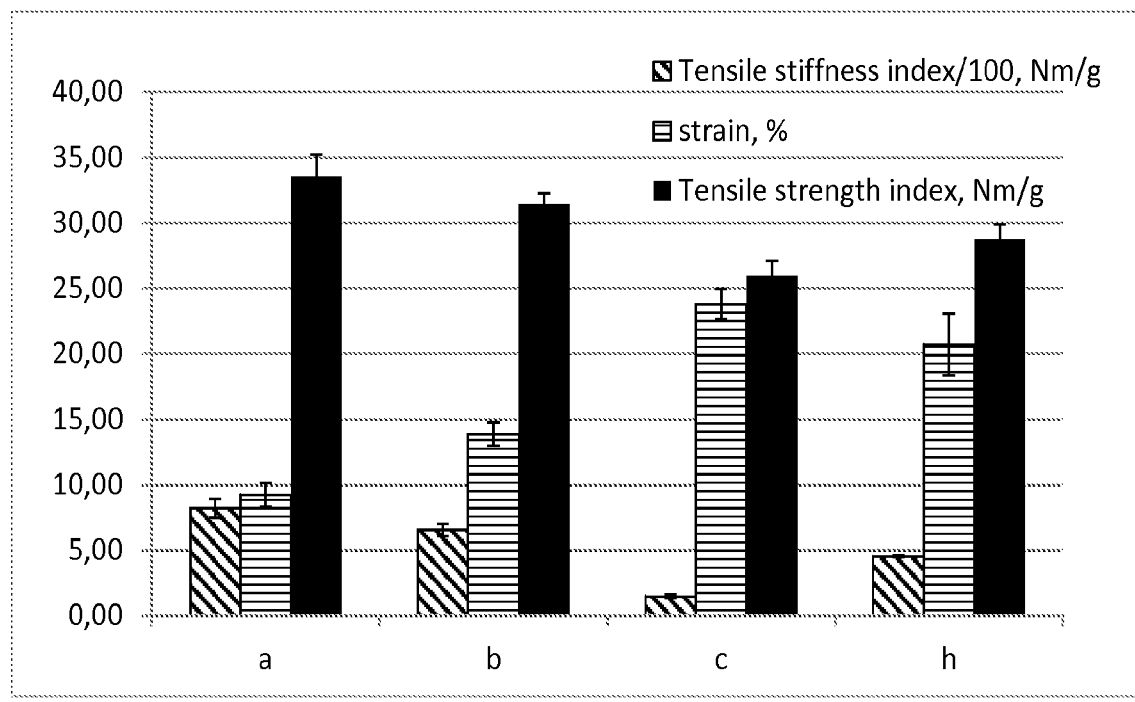
FIG. 3—Comparison of tensile stiffness, strain and tensile strength of nonwoven material treated with the compositions a, b, c and h. The comparison is based on the dry properties.

FIG. 3 compares tensile stiffness, strain and tensile strength of nonwoven material treated with compositions a, b c and h described above. A low tensile stiffness index value indicates that the treated material is soft. A high strain indicates that treated material has high elongation. A high tensile strength index value indicates that the treated material has high tensile strength.

PEC compositions b, c and h provide, as illustrated in FIG. 3, softer materials having lower tensile stiffness when compared to the materials treated with non-PEC composition a. Furthermore, the inclusion of plasticizer to PEC compositions c and h makes the treated materials softer (i.e. lower tensile stiffness) and more elastic (i.e. higher strain), however, the tensile strength decreased slightly. PEC composition c is advantageous since it provides nonwoven materials which are very soft as well as having high elongation and tensile strength.

All the samples are treated by padding and dried in the oven at 160° C. for 2 min according to Method 5 and tested according to Method 9.

Example 15—Dry Properties of Filter Paper

The aim of this example was to identify binders which provides the softest (lowest tensile stiffness value) material made of pure cellulose but wherein the material also has good dry tensile index.

Filter paper was used in order to correlate to various cellulose based products such as wipes, medical pads and food pads which can contain up to 100% cellulose.

All the samples were treated by padding and dried in the oven at 160° C. for 1.5 min according to Method 5 and tested according to Method 1.

Figure 4:
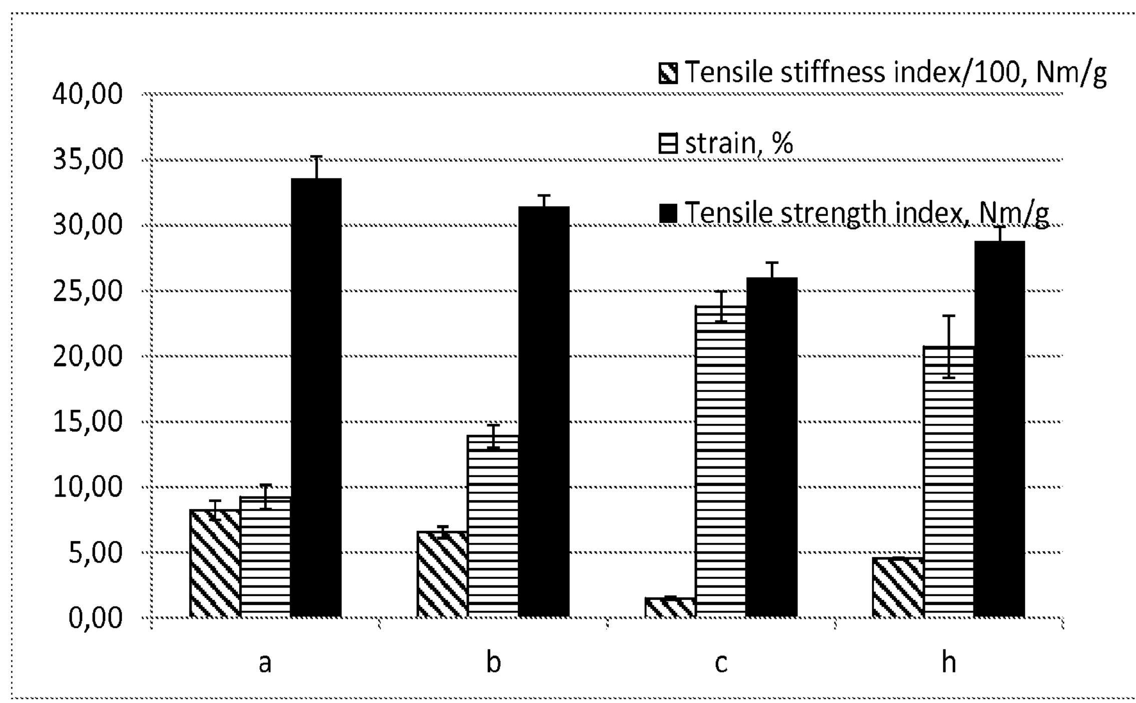
FIG. 4—Comparison of tensile stiffness, strain and tensile strength of cellulosic material (filter paper) treated with the compositions a, b, c and h. The comparison is based on the dry properties.

As can be seen from FIG. 4, the inclusion of plasticizer (Neosorb 70/70) increased elongation and lowered the stiffness, however, the tensile strength was lowered. Hence, compositions a and b without plasticizer are stiffer (i.e. higher stiffness index) than compositions c and h with plasticizer, and moreover, compositions a and b also have higher dry strength.

PEC composition c provided the softest cellulose materials, i.e. cellulose material having lowest tensile stiffness.

Example 16—Wet Properties of Filter Paper

Figure 5:
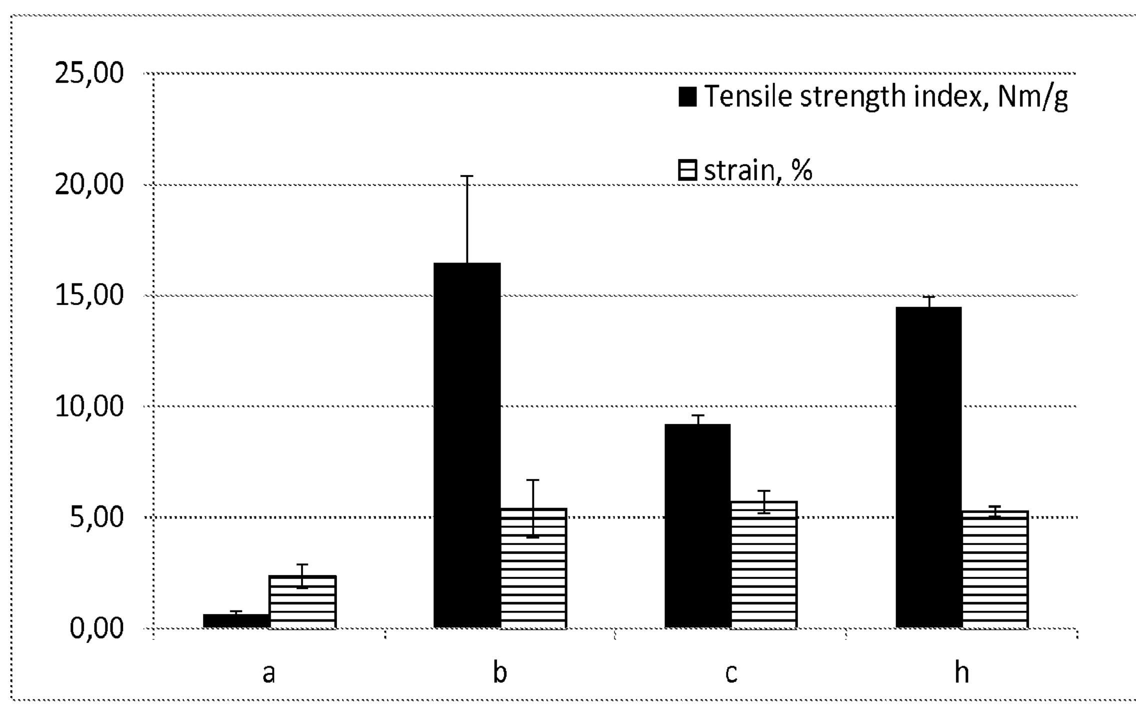
FIG. 5—Comparison of strain and tensile strength of cellulosic material (filter paper) treated with the compositions a, b, c and h. The comparison is based on the wet properties.

Wet properties of filter papers treated with PEC compositions and non-PEC compositions are compared in FIG. 5.

FIG. 5 indicates that the non-PEC binder composition a, has lower wet strength than the PEC compositions b, c and h. PEC composition b gives highest wet strength (see FIG. 5) and highest stiffness at dry state (see FIG. 4).

Addition of sorbitol in PEC compositions c and h decreases the wet tensile strength (see FIG. 5) slightly but provides lower stiffness and more elongation than PEC composition b (see FIG. 4).

Figure 6:
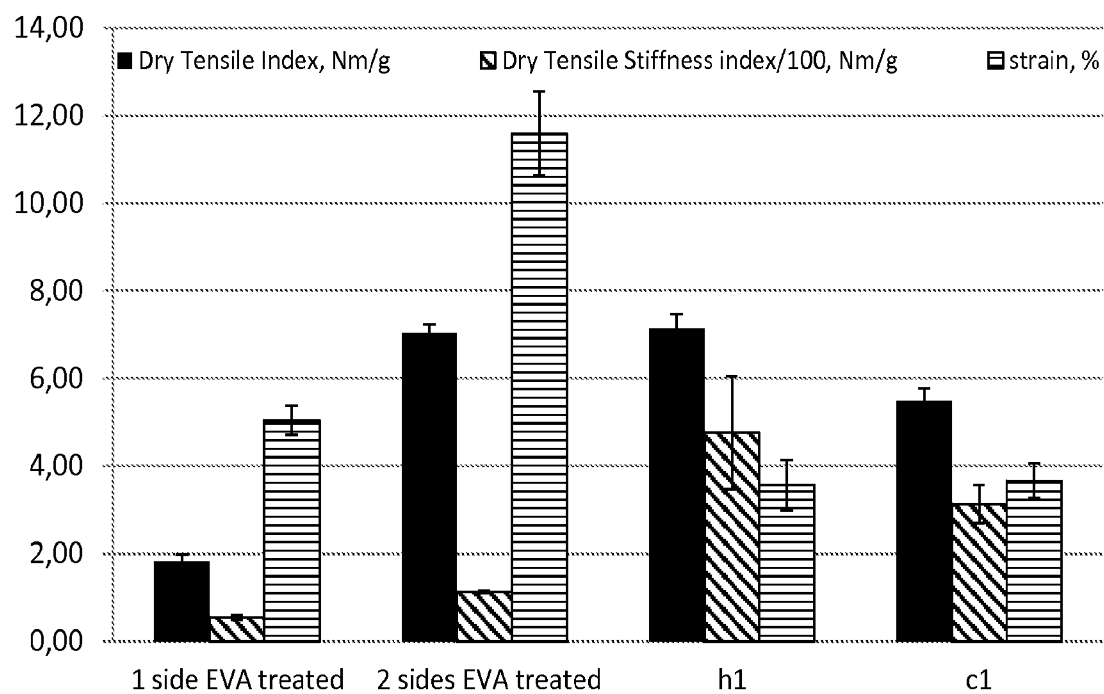
FIG. 6—Dry properties of 100% natural cellulosic based nonwoven material

Example 17—Dry Properties of 100% Cellulose Based Nonwoven Material FIG. 6

One side and two sides EVA treated 100% cellulose based nonwoven materials were compared with same material having one side EVA treated other side PEC composition h1 and c1 treated. All the samples are treated according to Method 5 dried at 160° C. for 1 min, and tested according to Method 9.

It is seen in FIG. 6 that h1 and c1 treated materials have similar tensile index as two sides EVA treated material showing that h1 and c1 act as good binder for the material.

Example 18—Wet Properties of 100% Cellulose Based Nonwoven Material

One side and two sides EVA treated 100% cellulose based nonwoven materials were compared with same material having one side EVA treated other side PEC composition h1 and c1 treated. All the samples are treated according to Method 5 dried at 160° C. for 1.5 min, and tested according to Method 10 with 30 seconds immersing in deionized water.

Figure 7:
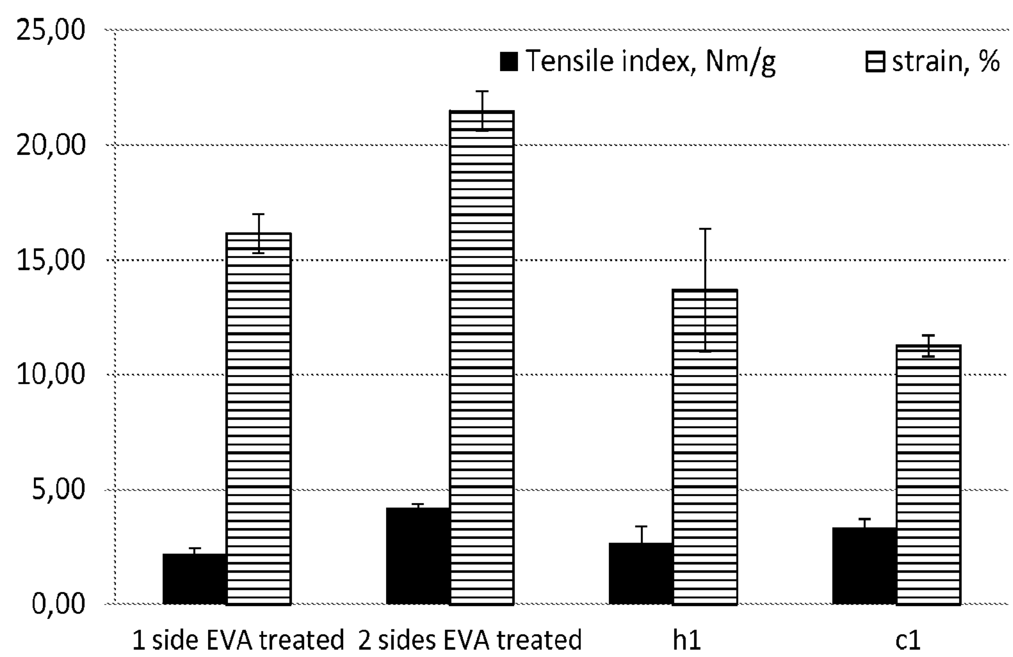
FIG. 7—Wet properties of 100% natural cellulosic based nonwoven material

As illustrated in FIG. 7 it can be seen that the treatment using h1 and c1 results in higher wet tensile index. Hence, c1 and h1 can be applied in an air-laid nonwoven process as a bio-based wet strength binder to replace synthetic EVA binders.

Example 19—Impact of Dilution of PEC Compositions on Mechanical Properties of Nonwoven A study was undertaken to study the dilution effects using PEC compositions c, c1, c2 and c3 on one side treated EVA 100% cellulose nonwoven material. The aim with the dilution study was to find a binder concentration which exerts a high level of (i) wet and dry strength, and (ii) low tensile stiffness.

All the samples are treated according to Method 5 curing at 160° C. for 1 minute.

Figure 8:
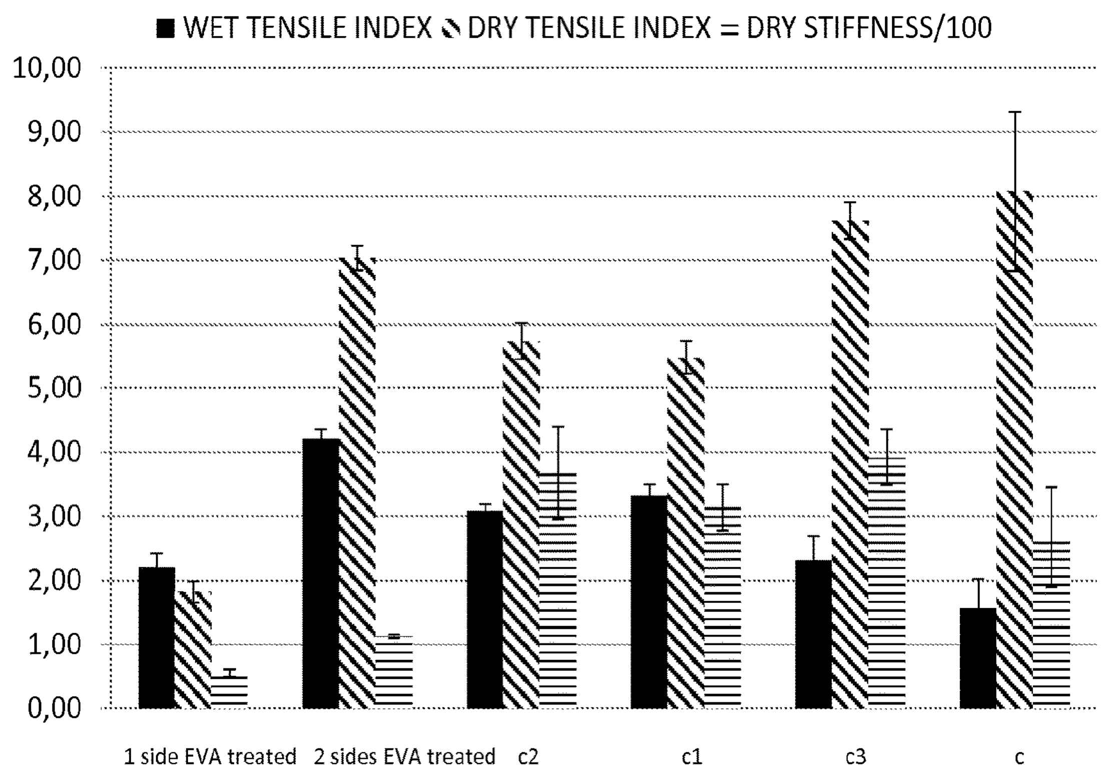
FIG. 8—Wet and dry tensile indexes as well as dry stiffness of materials treated with dilutions of c FIG. 9—Curing temperature versus wet and dry strength properties FIG. 10—Curing temperature versus wet strength properties

As illustrated in FIG. 8, c3 and c had higher dry tensile index than c2 and c1. However, the wet tensile index was lower for c3 and c when compared with c2 and c1. Importantly, c2, c1 and c3 reached to higher wet strength than 1 side EVA treated nonwoven which means that dilutions of c can further increase the wet strength of the material.

Example 20—Impact of Curing Temperature on Mechanical Properties

In this example the effect of curing temperature on wet tensile index, dry tensile index and dry stiffness index was investigated.

First test was performed using 100% biobased nonwoven materials.

The following process was used for treating the nonwoven material (see FIG. 12 for results):

PEC composition c2 was used

Treated according to method 5 using 100° C., 120° C. and 160° C., respectively, for 2 min.

For wet strength testing, Method 10 was used.

Figure 10:
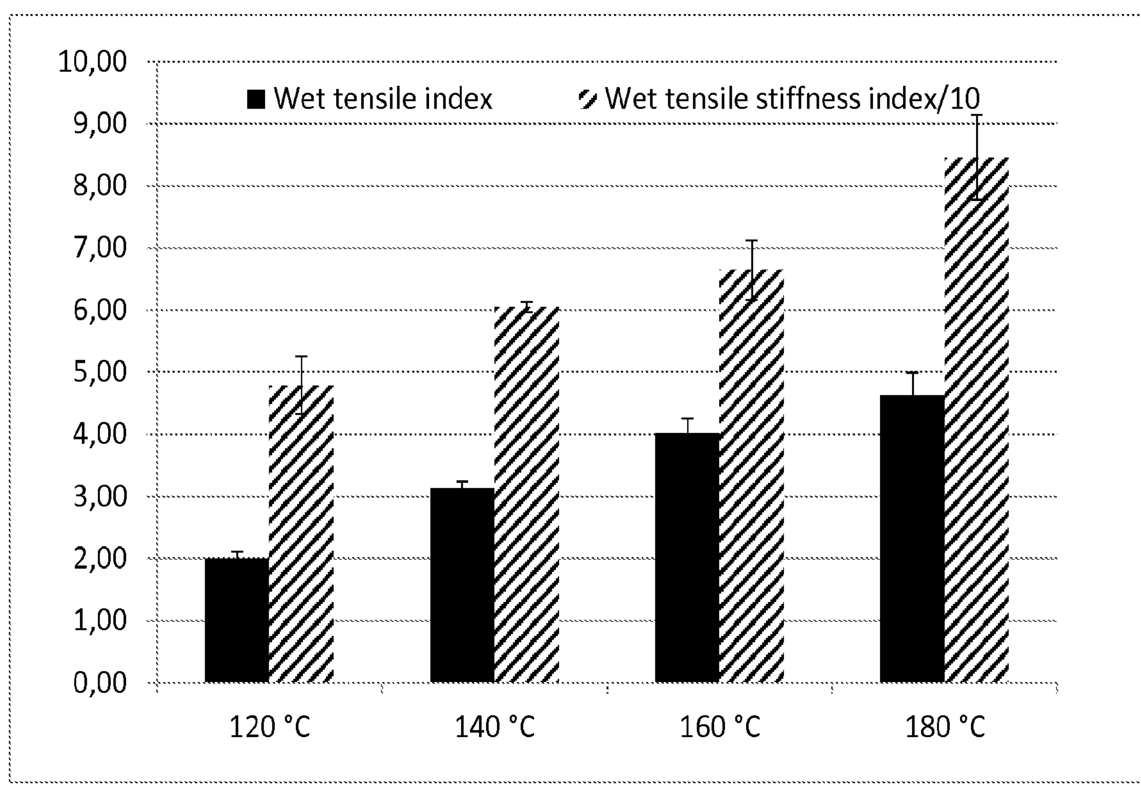

Secondly, the above procedure was used with curing temperatures at 100° C., 120° C., 160° C. and 180° C., respectively, for 2 minutes and tested another material with 100% cellulose having one side treated with EVA (see FIG. 10).

As illustrated in FIG. 10, increasing curing temperature is advantageous since the wet strength and dry strength increases. Importantly, at 160° C., 100% biobased nonwoven PEC-composition c2 treated material has the same or slightly higher wet strength than the EVA treated material. This indicates that PEC composition c2 can substitute synthetic EVA binder.

Figure 9:
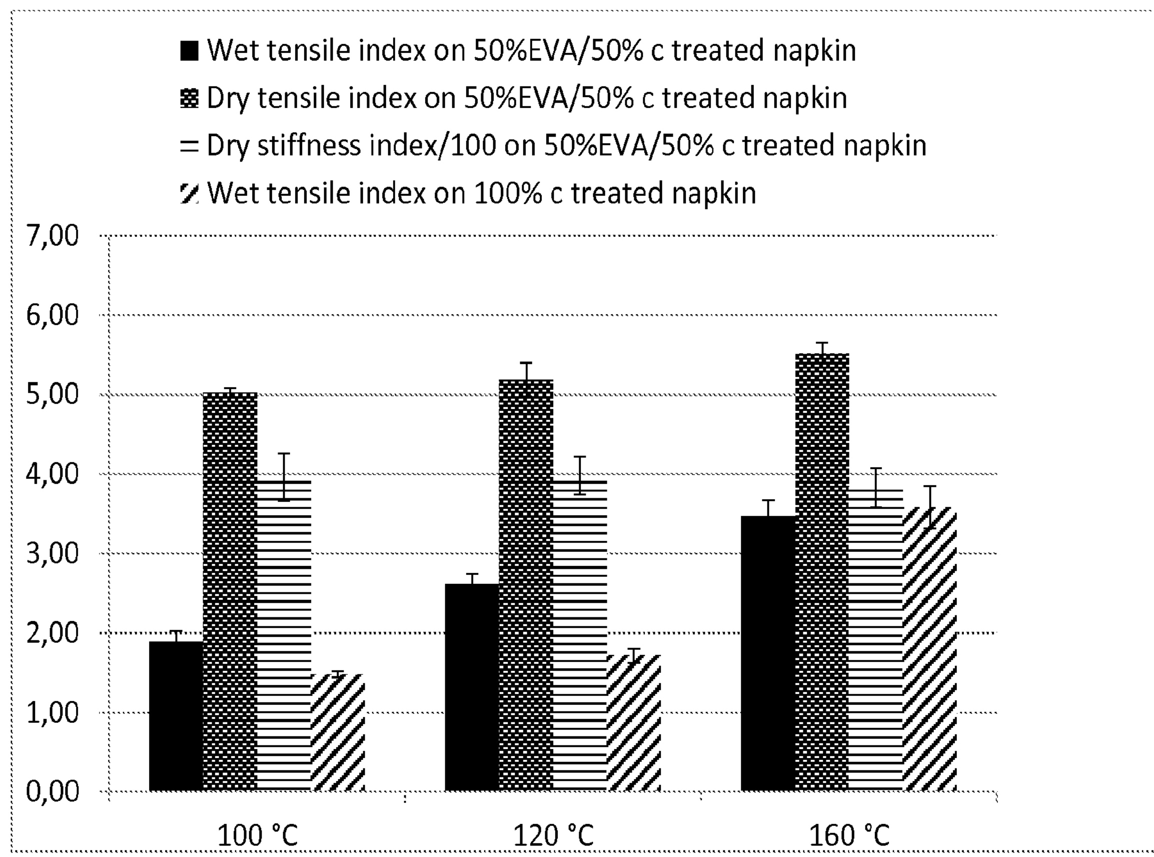

A correlation between the development of the wet tensile index (on PEC composition treated material) and temperature is obvious from FIGS. 9 and 10. Higher curing temperature gives higher wet tensile index.

It can be seen from FIG. 10 that a curing temperature of 160-180° C. results in a wet tensile index higher or the same as nonwoven materials having 2 sides treated with EVA (compare FIGS. 8, 9 and 10).

Example 21—Spraying of BB27 or c on Nonwoven Material Comprising a Mixture of Natural and Synthetic Fibers A nonwoven material comprising a mixture of natural and synthetic fibers was tested for dry and wet strength characteristics by spraying said material with 1 wt % of BB27 or 1 wt % of c and subsequently curing at 140° C. in a stenter frame oven for 3 min. As a reference both untreated material and EVA treated material was used for comparing mechanical properties with materials treated with BB27 and c. The tensile tests were conducted using Method 3 and Method 4.

The g/m$^2$ of the untreated and treated materials is shown in Table 19.

TABLE 19

Surface weight of treated nonwoven.

| Treatment | g/m2 |
|---|---|
| Untreated | 46.8 |
| EVA | 50.1 |
| c | 60.6 |
| BB27 | 64.8 |

TABLE 20

| Dry mechanical properties of treated nonwoven. DRY PROPERTIES | | | | |
|---|---|---|---|---|
| | Force @ peak (N) | Strain @ peak (%) | Tensile index (Nm/g) | Tensile stiffness index (Nm/g) |
| Untreated | 52.35 | 0.96 | 22.37 | 3596.23 |
| EVA | 148.48 | 4.22 | 59.27 | 3643.23 |
| c | 104.15 | 3.60 | 34.37 | 1736.06 |
| BB27 | 166.32 | 2.63 | 51.33 | 3233.17 |

The results of the dry strength characteristics summarized in Table 20 show that materials treated with c have the lowest tensile stiffness (i.e. softest material). Moreover, all of the treated materials have higher tensile index (i.e. higher dry strength) than untreated material. The results of the wet strength characteristics summarized in Table 21 show that materials treated with c and BB27 have a higher wet strength than untreated material and almost as high as EVA treated.

TABLE 21

| Wet mechanical properties of treated nonwoven. WET PROPERTIES | | | | |
|---|---|---|---|---|
| Sample | Force @ peak (N) | Strain @ peak (%) | Tensile index (Nm/g) | Tensile stiffness index (Nm/g) |
| Untreated | 1.00 | 2.34 | 0.43 | 64.51 |
| EVA | 87.57 | 11.78 | 34.96 | 744.43 |
| c | 29.90 | 4.91 | 26.45 | 436.41 |
| BB27 | 92.92 | 6.82 | 28.68 | 616.89 |

Hence, in view of the data presented in the above tables 20 and 21, PEC composition c provides the softest materials followed by BB27. Moreover, materials treated with c and BB27 provide higher dry and wet strength than untreated materials, meaning that the PEC compositions of the invention are suitable industrial binders.

Example 22—Comparison of Synthetic Binder with PEC Compositions of the Invention on 100% Viscose Nonwoven Material A 100% viscose nonwoven material (treated with EVA, PUR, PVOH, BB27 and c according to method 5 with curing at 140° C. for 3 minutes) was tested for dry and wet strength characteristics. Same tensile testing methods were used as in Example 34. The formulations of the binders were diluted to 1 wt % prior use.

The results of the dry strength characteristics summarized in Table 22 show that materials treated with EVA have the lowest tensile stiffness followed by c; however, materials treated with c and BB27 have higher tensile index (i.e. higher dry strength) than materials treated with EVA.

TABLE 22

| Dry mechanical properties of treated nonwoven (100% viscose) | | | | | | |
|---|---|---|---|---|---|---|
| | DRY PROPERTIES | | | | | |
| Prov | Strain @ peak (%) | stdv | Tensile index (Nm/g) | stdv | Tensile stiffness index (Nm/g) | stdv |
| Untreated | 16.44 | 2.54 | 24.45 | 1.11 | 170.26 | 11.94 |
| EVA (Vinnapas EN 1024) | 20.47 | 2.00 | 18.97 | 0.86 | 108.71 | 44.59 |
| PUR (Rhenappret FSP) | 15.00 | 1.87 | 25.09 | 0.94 | 452.68 | 139.30 |
| PVOH (Elvanol T25) | 8.96 | 1.32 | 32.17 | 1.17 | 1993.78 | 529.39 |
| C | 17.61 | 0.79 | 25.40 | 1.72 | 139.31 | 5.69 |
| BB27 | 12.88 | 0.99 | 25.28 | 1.03 | 891.72 | 196.49 |

None of the binders gave any increase on the wet strength of the tested materials as shown in Table 23, since the nonwoven material used was bonded by hydro entanglement and inherently very strong in itself. It is however obvious that the PEC compositions of the invention had no or very small weakening of the wet tensile index as compared to the untreated material, whereas for example EVA binder weakened the wet index property of the material.

TABLE 23

| Wet mechanical properties of treated nonwoven | | | | |
|---|---|---|---|---|
| | WET PROPERTIES | | | |
| Prov | Tensile index (Nm/g) | stdv | Tensile stiffness index (Nm/g) | stdv |
| Untreated | 13.31 | 0.72 | 53.67 | 2.76 |
| EVA (Vinnapas EN 1024) | 10.92 | 1.17 | 36.22 | 2.57 |
| PUR (Rhenappret FSP) | 12.38 | 0.85 | 48.45 | 4.47 |
| PVOH (Elvanol T25) | 12.63 | 1.26 | 48.15 | 4.93 |
| C | 13.00 | 0.45 | 50.54 | 2.11 |
| BB27 | 12.93 | 0.99 | 44.48 | 2.15 |

Example 23—Performance of PEC Compositions Comprising Gum Arabic and NCC

100% viscose nonwoven material and 100% cellulosic fibers were tested for dry and wet strength characteristics, respectively, by treating said material with EVA and with PEC compositions BB27, c, C/GA and C/NCC, all with charge ratio 0.62. Coating of nonwoven material was done according to Method 5 (curing in 150° C. for 3 min in stenter frame oven). All PEC-compositions were diluted to 1 wt % prior use. The tensile tests were conducted according to Method 3 and Method 4.

The dry properties summarized in Table 24 show that materials treated with EVA have the lowest tensile stiffness followed by c and C/NCC. However, all materials treated with the different PEC compositions have higher tensile index (i.e. higher dry strength) than materials treated with EVA. C/GA treated material have the highest stiffness.

TABLE 24

Dry mechanical properties of treated nonwoven

| | DRY PROPERTIES | | | | | |
|---|---|---|---|---|---|---|
| Prov | Strain @ peak (%) | stdv | Tensile index (Nm/g) | stdv | Tensile stiffness index (Nm/g) | stdv |
| Untreated | 16.44 | 2.54 | 24.45 | 1.11 | 170.26 | 11.94 |
| EVA (Vinnapas EN 1024) | 20.47 | 2.00 | 18.97 | 0.86 | 108.71 | 44.59 |
| C | 17.61 | 0.79 | 25.40 | 1.72 | 139.31 | 5.69 |
| BB27 | 12.88 | 0.99 | 25.28 | 1.03 | 891.72 | 196.49 |
| C/GA | 11.07 | 1.85 | 26.27 | 1.24 | 1513.53 | 404.33 |
| C/NCC | 14.77 | 0.78 | 24.91 | 1.27 | 205.87 | 49.91 |

The results of the wet strength characteristics summarized in Table 25 show that materials treated with C/NCC have the lowest tensile stiffness followed by (i) C/GA, and (ii) c.

TABLE 25

Wet mechanical properties of treated nonwoven

| | WET PROPERTIES | | | | | |
|---|---|---|---|---|---|---|
| Prov | Strain @ peak (%) | stdv | Tensile index (Nm/g) | stdv | Tensile stiffness index (Nm/g) | stdv |
| Untreated | 17.67 | 2.66 | 1.44 | 0.10 | 22.52 | 3.31 |
| EVA (Vinnapas EN 1024) | 18.92 | 2.42 | 3.31 | 0.38 | 82.84 | 12.40 |
| C | 19.08 | 2.38 | 1.87 | 0.23 | 47.97 | 13.28 |
| BB27 | 18.92 | 3.00 | 3.43 | 0.23 | 102.46 | 6.43 |
| C/GA | 20.97 | 2.47 | 1.46 | 0.15 | 45.07 | 11.70 |
| C/NCC | 18.14 | 2.94 | 1.45 | 0.16 | 20.36 | 4.50 |

Example 24—Performance Stability Over Time for c and BB27 Formulations

The performance stability of the c and BB27 formulation was investigated. Formulations were produced and left in, 40° C., 23° C. or 8° C. 100% viscose nonwoven was treated according to Method 5 (curing in 150° C. for 3 min in Termaks oven but using a stenter frame) and tensile tests were performed according to Method 3 and 4. All PEC-compositions were diluted to 1 wt % prior use. As indicated in Table 26, c did not lose its dry properties performance after 7 months aging at 23° C., nor after 3 months at 40° C. BB27 performed equally well when stored 8 months at 8° C. as freshly prepared.

TABLE 26

Performance for c and BB27 after some months of storage in different temperatures

| | DRY PROPERTIES | | | | | |
|---|---|---|---|---|---|---|
| Sample | Strain @ peak (%) | stdv | Tensile index (Nm/g) | stdv | Tensile stiffness index (Nm/g) | stdv |
| c freshly prepared | 17.6 | 0.8 | 25.4 | 1.7 | 139.3 | 5.7 |
| BB27 freshly prepared | 12.9 | 1.0 | 25.3 | 1.0 | 891.7 | 196.5 |
| c 7.5 months at 23° C. | 18.0 | 1.0 | 22.7 | 1.5 | 130.9 | 8.9 |
| c 3 months at 40° C. | 17.2 | 0.7 | 24.45 | 1.1 | 145.16 | 7.58 |
| BB27 8 months at 8° C. | 11.62 | 1.47 | 27.07 | 1.6 | 1258.78 | 315 |

As indicated in Table 27, c did not lose wet properties performance after storage for 7 months at 23° C., nor after 3 months at 40° C. BB27 performed equally well when stored 8 months at 8 ° C. as freshly prepared.

TABLE 27

Performance for c and BB27 after some months of storage in different temperatures

| | WET PROPERITES | | | | | |
|---|---|---|---|---|---|---|
| Sample | Strain @ peak (%) | stdv | Tensile index (Nm/g) | stdv | Tensile stiffness index (Nm/g) | stdv |
| c freshly prepared | 19.1 | 2 | 1.9 | 0.2 | 48.0 | 13.3 |
| BB27 freshly prepared | 18.9 | 3.0 | 3.4 | 0.2 | 102.5 | 6.4 |
| c 7.5 months at 23° C. | 19.8 | 2.6 | 2.2 | 0.2 | 55.8 | 14.9 |
| c 3 months at 40° C. | 17.0 | 3.0 | 2.1 | 0.1 | 56.5 | 14.7 |
| BB27 8 months at 8° C. | 19.4 | 2.6 | 3.5 | 0.2 | 94.8 | 20.4 |

Also, after one 9 days long freeze thaw cycle for c, it was used as binder following Method 5 (150° C. for 3 min using a stenter frame oven) for coating and Method 3 and 4 for tensile tests resulting in table 28 dry properties data.

TABLE 28

Dry properties for 100% viscose nonwoven treated with freshly prepared and freeze/thawed c

| | DRY PROPERTIES | | | | | |
|---|---|---|---|---|---|---|
| Sample | Strain @ peak (%) | stdv | Tensile index (Nm/g) | stdv | Tensile stiffness index (Nm/g) | stdv |
| c freshly prepared | 17.6 | 0.8 | 25.4 | 1.7 | 139.3 | 5.7 |
| c freeze/thawed for 9 days | 16.9 | 0.1 | 20.8 | 0.7 | 128.7 | 10.1 |

Wet properties for freeze/thawed c are shown in Table 29.

TABLE 29

Wet properties for 100% viscose nonwoven treated with freshly prepared and freeze/thawed c

| | WET PROPERTIES | | | | | |
|---|---|---|---|---|---|---|
| Sample | Strain @ peak (%) | stdv | Tensile index (Nm/g) | stdv | Tensile stiffness index (Nm/g) | stdv |
| c freshly prepared | 19.1 | 2.4 | 1.9 | 0.2 | 48.0 | 13.3 |
| c freeze/thawed for 9 days | 17.0 | 4.1 | 2.0 | 0.2 | 54.2 | 15.4 |

After one freeze/thaw cycle, c loses some of its dry strength while wet properties are unaffected.

Example 25—Water Absorption Capacity

Since napkins must have a certain ability to absorb water, the water absorption capacity for nonwovens treated with c1 was measured according to Method 11. Two side EVA treated cellulosic nonwoven was used as a reference. Two nonwoven materials were tested: 100% viscose nonwoven with EVA on one side and 100% viscose nonwoven that was bounded together with a binder that did not give wet strength. The first material was treated with PEC composition c using padder according to method 5. The second material was treated with PEC composition c using spray equipment. The results are shown in Table 30.

TABLE 30

Water absorption performance of different binder treated materials.

| Samples | Uptake, % | $H_2O$ Capacity, g/g | Performance<br>Water absorption speed | Hand feeling | Wet strength |
|---|---|---|---|---|---|
| Reference (nonwoven bounded on two sides with EVA) | 11.60 | 5.6 | + | Fluffy/prickly | + |
| c applied on nonwoven with non-wet strength binder | 11.55 | 3.7 | + | Smooth | + |
| c applied on one side EVA nonwoven | 10.22 | 4.4 | + | Smooth | + |

c treated on both materials described above showed the same fast water absorption ability as commercial tissue paper/reference. Besides the equally good wet strength which is shown in other examples, the hand feeling of c treated wet materials are smoother than wet two sided treated with EVA.

We claim:

1. Method of treating materials, said materials comprising fiber based materials, textiles, woven and nonwoven materials, to increase said materials' dry strength and/or wet strength, the method comprising applying a bio-based polyelectrolyte complex (PEC) composition suitable as a binder, wherein the PEC composition comprises a cationic biopolymer, an anionic biopolymer, an acid and a preservative, and wherein the net charge of the PEC is cationic, the charge ratio of the anionic biopolymer and the cationic biopolymer is <1, the cationic biopolymer is chitosan, wherein the concentration of cationic biopolymer is 0.005-30% and the chitosan has a degree of deacetylation of 66-100%, the anionic biopolymer is polyanions derived from nature the acid is a Brønsted acid and/or a Lewis acid, wherein the Brønsted acid is selected from any organic and/or inorganic acids, wherein the Lewis acid is selected from any cationic mono- or multivalent atom, and wherein the concentration of the acid is 0.01-30 wt %, the weight ratio between cationic biopolymer and anionic biopolymer is 1:0.1 to 1:20, the weight ratio between cationic biopolymer and acid is 1:0.1 to 1:30; and the pH is less than 7 wherein the PEC composition comprises water selected from tap water, distilled water and/or deionized water, and at least 0.05 wt % of a water soluble plasticizer, selected from one or more of polyols or monosaccharides.

2. The method according to claim 1, further comprising curing the treated fiber based materials, textiles, woven and nonwoven materials, wherein the curing is performed at 20° C. to 200° C.

3. The method according to claim 1, comprising the steps of:

a) diluting the PEC composition with water selected from distilled water, tap water and deionized water;

b) treating the fiber based materials, textiles, woven and nonwoven materials with the diluted PEC composition by addition to fiber, textile, woven and nonwoven suspensions, spray coating, dip coating, roll coating, impregnation, padding, screen coating, printing, direct coating methods including knife coating, blade coating, wire wound bar coating, round bar coating and crushed foam coating, indirect coating methods including mayer rod coating, direct roll coating, kiss coating, gravure coating and reverse roll coating, ink jet and/or slit-die/slot-die; and c) optionally curing the treated fiber based materials, textiles, woven and nonwoven materials.

4. The method according to claim 1, wherein the polyols or monosaccharide are selected from one or more of glycerol, sorbitol, mannitol, xylitol glucose, mannose, fructose, sucrose, sucralose, sucrose esters, glycerol triacetate, glycerin, ethylene glycol, triethylene glycol, tetraethylene glycol, polyethylene glycol and propylene glycol.

* * * * *